(12) United States Patent
Horiguchi et al.

(10) Patent No.: US 7,970,065 B2
(45) Date of Patent: Jun. 28, 2011

(54) COMMUNICATION APPARATUS AND PROGRAM

(75) Inventors: Tomoya Horiguchi, Inagi (JP); Tazuko Tomioka, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 899 days.

(21) Appl. No.: 11/827,549

(22) Filed: Jul. 12, 2007

(65) Prior Publication Data

US 2008/0069275 A1 Mar. 20, 2008

(30) Foreign Application Priority Data

Sep. 15, 2006 (JP) .................................. 2006-251605

(51) Int. Cl.
*H04K 1/10* (2006.01)
(52) U.S. Cl. ........ 375/260; 375/259; 375/267; 375/295; 375/297; 375/342; 370/333; 370/334
(58) Field of Classification Search .................. 375/130, 375/135, 137, 145, 220, 222, 259, 260, 267, 375/295, 316, 342, 343, 262, 346, 350
See application file for complete search history.

(56) References Cited

U.S. PATENT DOCUMENTS

| | | | | |
|---|---|---|---|---|
| 7,702,285 | B2 * | 4/2010 | Austin et al. ............... | 455/67.11 |
| 7,773,660 | B2 * | 8/2010 | Schmandt et al. ........... | 375/135 |
| 7,860,502 | B2 * | 12/2010 | Kim et al. ...................... | 455/436 |
| 2006/0109931 | A1 * | 5/2006 | Asai et al. ..................... | 375/299 |
| 2007/0133387 | A1 * | 6/2007 | Arslan et al. .................. | 370/206 |
| 2007/0280332 | A1 * | 12/2007 | Srikanteswara et al. ...... | 375/130 |

FOREIGN PATENT DOCUMENTS

| | | |
|---|---|---|
| JP | 2000316013 | 11/2000 |
| JP | 2001-333081 | 11/2001 |
| JP | 2005512436 | 4/2005 |
| JP | 2006135674 | 5/2006 |
| JP | 2006222665 | 8/2006 |

OTHER PUBLICATIONS

Japanese Search Report with Translation dated May 27, 2008 based on JP application No. 2006251605.

* cited by examiner

*Primary Examiner* — Shuwang Liu
*Assistant Examiner* — Hirdepal Singh
(74) *Attorney, Agent, or Firm* — Ohlandt, Greeley, Ruggiero & Perle, L.L.P.

(57) ABSTRACT

A communication apparatus includes unit measuring a first interference feature quantity indicating a state of an interference signal in a transmission frequency band (TFB), unit determining from the first interference feature quantity whether the interference signal exists in the TFB, unit acquiring, after measurement of the first interference feature quantity, a transmission channel from a second interference feature quantity measured by the measuring unit, the transmission channel corresponding to at least one of a frequency orthogonal to the interference signal, a time orthogonal to the interference signal, a space orthogonal to the interference signal, and a spreading code orthogonal to the interference signal, and unit performing a first transmission using the TFB when it is determined that no interference signal exists in the TFB, and to perform a second transmission using the transmission channel when it is determined that the interference signal exists in the TFB.

7 Claims, 12 Drawing Sheets

US 7,970,065 B2

COMMUNICATION APPARATUS AND PROGRAM

CROSS-REFERENCE TO RELATED APPLICATIONS

This application is based upon and claims the benefit of priority from prior Japanese Patent Application No. 2006-251605, filed Sep. 15, 2006, the entire contents of which are incorporated herein by reference.

BACKGROUND OF THE INVENTION

1. Field of the Invention

The present invention relates to a communication apparatus and program for interference detection and signal transmission methods.

2. Description of the Related Art

As a conventional system for performing interference measurement and signal transmission, there is a system that coexists with another system using the same frequency as the former. In this system, it is determined, using an interfering signal-level determination circuit, whether there exists an interfering signal, and if the level of a received interfering signal exceeds a threshold value, signal transmission is interrupted for a preset time and then resumed (see, for example, JP-A 2001-333081 (KOKAI)).

In the prior art, no problem will occur when a plurality of systems utilizing a narrow-band time-division scheme coexist. However, when systems utilizing a wide-band frequency-division scheme coexist, if interference detection is performed for only a short time, detailed features of interference cannot be detected, and hence communication of signals made to be orthogonal to interfering signals cannot be executed. As a result, communication may be interrupted.

Further, the system throughput may be significantly reduced because of the influence of unlicensed systems existing in the same frequency band. In addition, to detect detailed features of interference, much time is required, which results in reduction of the system throughput.

BRIEF SUMMARY OF THE INVENTION

In accordance with an aspect of the invention, there is provided a communication apparatus comprising: a measuring unit configured to measure a first interference feature quantity indicating a state of an interference signal in a transmission frequency band; a determination unit configured to determine from the first interference feature quantity whether the interference signal exists in the transmission frequency band; an acquisition unit configured to acquire, after measurement of the first interference feature quantity, a transmission channel from a second interference feature quantity measured by the measuring unit, the transmission channel corresponding to at least one of a frequency orthogonal to the interference signal, a time orthogonal to the interference signal, a space orthogonal to the interference signal, and a spreading code orthogonal to the interference signal; and a transmission unit configured to perform a first transmission using the transmission frequency band when it is determined that no interference signal exists in the transmission frequency band, and to perform a second transmission using the transmission channel when it is determined that the interference signal exists in the transmission frequency band.

In accordance with another aspect of the invention, there is provided a communication apparatus comprising: a measuring unit configured to measure a first interference feature quantity indicating a state of an interference signal in a transmission frequency band; a determination unit configured to determine from the first interference feature quantity whether the interference signal exists in the transmission frequency band; a first transmission unit configured to transmit a first signal using the transmission frequency band when it is determined that no interference signal exists in the transmission frequency band; a detection unit configured to detect, when it is determined that the interference signal exists in the transmission frequency band, a transmission channel in the transmission frequency band, based on a second interference feature quantity measured by the measuring unit, the transmission channel corresponding to at least one of a frequency orthogonal to the interference signal, a time orthogonal to the interference signal, a space orthogonal to the interference signal, and a spreading code orthogonal to the interference signal; and a second transmission unit configured to transmit a second signal using the detected transmission channel.

In accordance with yet another aspect of the invention, there is provided a communication apparatus comprising: a storage unit configured to store a plurality of channel information items corresponding to feature quantities of interference signals, respectively, and a plurality of priority information items related to the channel information items, respectively; a measuring unit configured to measure a first interference feature quantity indicating a state of an interference signal in a transmission frequency band; a determination unit configured to determine from the first interference feature quantity whether the interference signal exists in the transmission frequency band; a first transmission unit configured to transmit a first signal using the transmission frequency band when it is determined that no interference signal exists in the transmission frequency band; an acquisition unit configured to acquire interference channel information from a second interference feature quantity measured by the measuring unit, when it is determined that the interference signal exists in the transmission frequency band; and a second transmission unit configured to transmit a second signal using the transmission frequency band when the priority information item related to one of the channel information items indicates that a communication of the communication apparatus has priority over a communication of the interference signal, the priority information item corresponding to the interference channel information.

DETAILED DESCRIPTION OF THE INVENTION

Communication apparatuses and programs according to embodiments will be described in detail with reference to the accompanying drawings.

The communication apparatuses and programs according to the embodiments can increase the throughput of a system (hereinafter referred to as "the own system") to which the apparatuses belong, with the probability of interference with other systems kept low.

Figure 1:
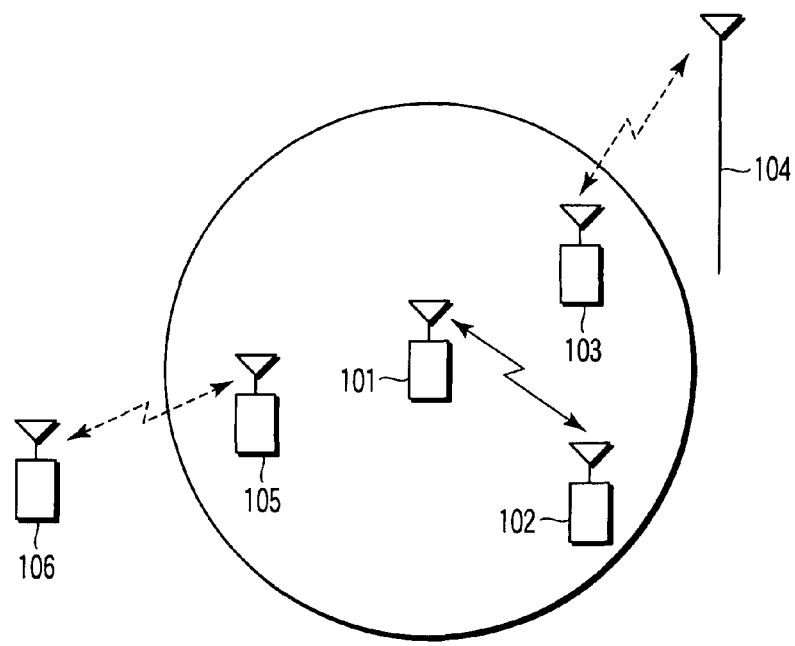
FIG. 1 is a view useful in explaining the relationship between a communication system including communication apparatuses according to embodiments, and another communication system.

Referring first to FIG. 1, a description will be given of a configuration example of a system including the communication apparatuses according to the embodiments.

A terminal (communication apparatus) 101 and terminal 102 operate in accordance with a communication system employed in the embodiments. The terminals 101 and 102 perform communication using a certain frequency band. In the description below, it is assumed that signal transmission/reception is performed utilizing a time-division multiplexing scheme. However, the techniques disclosed below are also applicable to signal transmission/reception based on a frequency-division multiplexing scheme.

If a terminal 103 accesses a base station 104 near the terminal 102 during when the terminals 101 and 102 access each other, using the same frequency band, interference occurs between the systems. Assume here that the terminal 103 and base station 104 are included in a system licensed in the frequency band, and hence have priority of communication. Assume also that the licensed system is, for example, the personal handyphone system (PHS) in a 19-GHz band, the personal digital cellular (PDC) system in an 800-MHz band, the wideband code division multiple access (W-CDMA) system in a 2-GHz band, or CDMA 2000. In this case, assume that the terminals 101 and 102 must recognize that communication between the terminal 103 and base station 104 has started, and minimize their interference with the communication between the terminal 103 and base station 104.

Further, if terminals 105 and 106 have started communication in the same frequency band as that of communication between the terminals 101 and 102, they interfere with the terminals 101 and 102. Assume here that the terminals 105 and 106 are not licensed in the frequency band and hence do not have priority of communication. For instance, assume that the terminals 105 and 106 are of, for example, Bluetooth in a 2.4-GHz band, wideband-code division multiple access (W-LAN) in a 2.4-GHz or 5-GHz band, or ultra-wideband modulation UWB in a 3 to 12-GHz wideband. In this case, assume that even if non-licensed terminals cause more or less interference, they may continue their communication, if the interference little influences communication between licensed terminals.

First Embodiment

Figure 2:
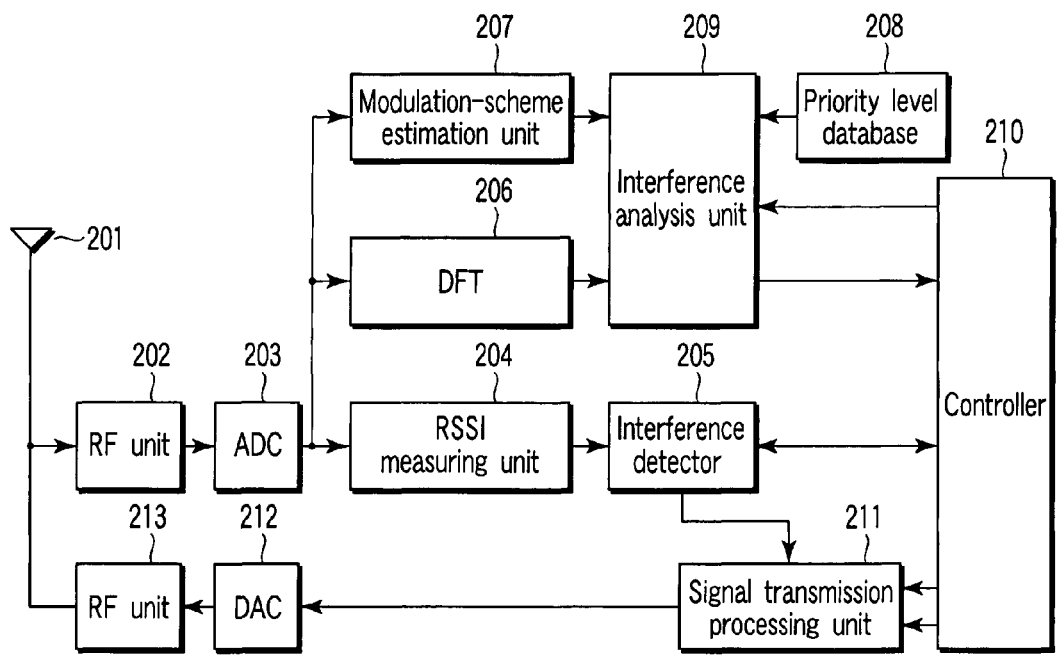
FIG. 2 is a block diagram illustrating a communication apparatus according to a first embodiment.

Referring now to FIG. 2, a communication apparatus according to a first embodiment will be described. This communication apparatus corresponds to the terminal 101 or 102 shown in FIG. 1. The communication apparatus of the first embodiment detects and analyzes interference. Detection of interference is executed by an RSSI measuring unit 204 and interference detector 205. Analysis of interference is executed by an interference analysis unit 209, using data supplied from a DFT 206, modulation-scheme estimation unit 207 and priority level database 208.

The communication apparatus of the first embodiment comprises an antenna 201, radio-frequency processing unit (RF unit) 202, analog-to-digital converter (ADC) 203, received-signal-intensity (RSSI) measuring unit 204, interference detector 205, discrete Fourier transformer (DFT) 206, modulation-scheme estimation unit 207, priority level database (DB) 208, interference analysis unit 209, controller 210, signal transmission processing unit 211, digital-to-analog converter (DAC) 212 and RF unit 213.

The RF unit 202 converts a signal received by the antenna 201 into a baseband signal. The ADC 203 converts the baseband signal into a digital signal.

The RSSI measuring unit 204 measures the RSSI of the digital signal received from the ADC 203.

The interference detector 205 detects whether an interfering signal exists in a certain frequency band. The interference detector 205 compares the power of a received signal with a threshold value based on thermal noise power, in a certain frequency band in which signal transmission is performed. The detector 205 determines that an interfering signal exists if the received-signal power is higher than the threshold value, and determines that no interfering signal exists if the former is lower than the latter. Thus, whether interference exists can be detected in a short time by the determination as to whether interference exists, using interference power as a characterizing amount.

Specifically, the interference detector 205 compares, with a threshold value, an RSSI measurement value acquired from the RSSI measuring unit 204. The threshold value is preset as, for example, power substantially identical to thermal noise power (e.g., −174 dBm/Hz). When the measured RSSI value is lower than the threshold value, the interference detector 205 determines that there is no interference in the frequency band in which signal reception is performed, thereby permitting the signal transmission processing unit 211 to execute signal transmission processing, and informing the controller 210 that the result of the interference detection indicates no interference. On the other hand, when the measured RSSI value is not less than the threshold value, the interference detector 205 determines that interference exists in the band, thereby supplying the signal transmission processing unit 211 with an instruction to interrupt signal transmission processing, and informing the controller 210 of the interruption of signal transmission processing.

In this case, the instruction to interrupt signal transmission processing may be sent to the DAC 212 to interrupt signal transmission processing, instead of being sent to the signal transmission processing unit 211. Further, the signal interruption mechanism may be modified such that the RF unit 213 incorporates a variable band-passing filter, and the interference detector 205 causes the RF unit 213 to alter the passing band of the variable band-passing filter, in order to prevent signals of the frequency band detected to contain interference by the interference detector 205 from passing through the filter. Alternatively, the RF unit 213 may contain a power amplifier (PA), and the interference detector 205 causes the RF unit 213 to turn off the power supply of the PA, in order to interrupt signals of the frequency band detected to contain interference by the interference detector 205. The interference detector 205 will be described later in more detail with reference to FIGS. 3 and 4.

The DFT 206 performs sampling of an interference signal and acquires the frequency characteristic of the signal as a feature quantity by discrete Fourier transform. Specifically, the DFT 206 receives a digital signal from the ADC 203 and subjects it to discrete Fourier transform. The values acquired by the transform are regarded as a feature quantity of the interference signal and correspond to the power levels of the frequency components of the interference signal. Although this embodiment employs discrete Fourier transform, a filter bank or a device for acquiring a frequency characteristic utilizing orthogonal demodulation frequency sweep processing may be used instead of the DFT 206.

The modulation-scheme estimation unit 207 receives a digital signal from the ADC 203, and estimates the modulation scheme of the interference signal, utilizing a feature quantity such as amplitude dispersion or phase dispersion. The modulation-scheme estimation unit 207 acquires, as other feature quantities, the coming direction of the interference signal, the standard variation of the amplitudes of the interference signal, the standard variation of the absolute values of the amplitudes, the peak property of the amplitudes, the standard deviation of the absolute values of the frequency components of the interference signal, the peak property of the frequency components, the standard deviation of the phases of the interference signal, the standard deviation of the absolute values of the phases, the frequency components of normalized absolute amplitudes, the existence/non-existence of right and left frequency components, the asymmetry of the frequency components, mid-frequency power, the maximum power of the frequency components, etc. From these feature quantities, the modulation-scheme estimation unit 207 can estimate the modulation scheme and symbol rate.

The priority level database (DB) 208 stores information indicating a plurality of systems (e.g., frequencies the systems can use) in relation to information indicating whether each system has a higher priority than the own system. The priority level database 208 prestores the priority degrees of the systems in the frequency band that can be used by the apparatus for signal transmission. These priority degrees are used as criterion values for determining the priority of each system. The priority level database 208 may store, as well as the frequency band and system priority information, information indicating the modulation scheme, symbol rate, signal frequency bandwidth, signal power, pilot pattern, burst length, duty ratio, etc., and may be used for interference analysis and system estimation. The priority level database 208 may be formed of a ROM, removable memory or a RAM having its data signal updated with a signal input thereto.

The interference analysis unit 209 performs analysis to detect in which frequency band and what type of signal exists as an interference signal. The interference analysis unit 209 estimates the frequency band, modulation scheme and symbol rate of an interference signal, and estimates the system of the interference signal by comparing the estimated information with the modulation scheme and symbol rate of each system in the frequency band, thereby estimating the system of the interference signal. If the priority of the estimated system is higher than the own system, the interference analysis unit 209 supplies the controller 210 with an instruction not to resume signal transmission processing, and to interrupt the current communication or continue the current communication using another frequency band. The interference analysis unit 209 receives power corresponding to each frequency component of the interference signal from the DFT 206, receives information indicating the estimated modulation scheme of the interference signal from the modulation-scheme estimation unit 207, receives information indicating the priority degree of the estimated system from the priority level database 208, and receives information indicating the previous interference analysis result from the controller 210, thereby determining whether signal transmission processing can be resumed, based on the received information items. The interference analysis unit 209 confirms, based on the information from the DFT 206, the frequency band that contains the interference signal (i.e., the frequency characteristic of the interference signal). If the interference analysis unit 209 determines from the result of the interference analysis that signal transmission processing can be resumed, it informs the controller 210 of the analysis result that signal transmission processing can be resumed. In contrast, if the interference analysis unit 209 determines from the result of the interference analysis that signal transmission processing cannot be resumed, it informs the controller 210 of the analysis result that signal transmission processing cannot be resumed.

If the interference detector 205 detects another interference signal in the frequency band in which the preceding interference signal was detected immediately before the preceding signal transmission process, the interference analysis unit 209 performs interference analysis with a smaller quantity of processing than the preceding quantity, utilizing the preceding interference analysis result. Thus, the time required for interference analysis is reduced. For instance, concerning the frequency band of the interference signal, the accuracy of interference analysis is reduced compared to the preceding interference analysis. Further, the interference analysis unit 209 stores, in the memory of the controller 210, the history of the past several interference analysis processes. When an interference signal exists in the frequency band in which a previous interference signal included in the history was found, the interference analysis unit 209 may compare the modulation schemes of the interference signals. In addition, the time of the preceding interference signal analysis process may be stored as a time history in the memory of the controller 210, and the modulation scheme may be selected from all candidates if the period elapsing from the time of the preceding interference signal analysis process to the time of the present one is greater than a threshold value, and/or if an interference signal is found in the frequency band in which the preceding interference signal was found.

Although, in the embodiment, the interference analysis unit 209 estimates the system of the apparatus that is transmitting an interference signal, using only a measured frequency band and estimated modulation scheme, it may perform system estimation based on signal power, signal frequency bandwidth, symbol rate, signal frequency bandwidth, signal power, pilot pattern, burst length, duty ratio, etc. Further, the interference analysis unit 209 may notice the estimated system, through broadcasting using a common indicator pattern or common protocol. The operation of the interference analysis unit 209 will be described later in detail with reference to FIG. 6. The interference analysis unit 209 will be described in detail with reference to FIGS. 3 and 4.

Upon receiving a notice from the interference analysis unit 209, the controller 210 supplies an instruction to the signal transmission processing unit 211. For instance, upon receiving the result of interference analysis, the controller 210 resumes signal transmission if the priority of the system of the apparatus that is transmitting an interference signal is lower than the own system, and starts processing for performing communication using a frequency band different from that used in the preceding transmission, if the former priority is higher than the latter priority. Further, the controller 210 has a memory for storing the interference analysis results (e.g., the frequency band in which interference analysis is performed, and the modulation scheme of the interference signal) of the interference analysis unit 209. This memory also stores information indicating whether interference analysis was performed during the preceding transmission process. The memory may also store a result of interference detection acquired at a preset past time.

The signal transmission processing unit 211 performs signal processing for transmitting data in accordance with an instruction from the controller 210, and transfers the processed (digital) signal to the DAC 212. The DAC 212, in turn, converts the digital signal into an analog signal. The RF unit 213 receives the analog signal and converts it into a transmission signal. The transmission signal is transmitted through the antenna 201.

Figure 3:
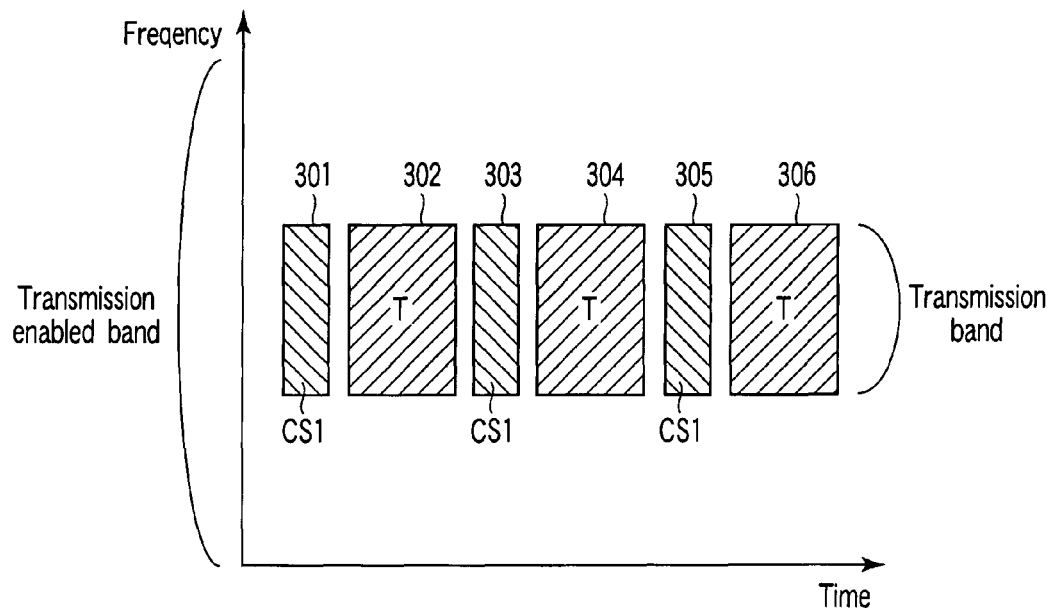
FIG. 3 is a view illustrating examples of interference detection processing and signal transmission processing performed by the communication apparatus of FIG. 2.

Referring now to FIG. 3, examples will be given of interference detection and signal transmission performed by the terminal 101 in the first embodiment.

Assume here that the terminals 101 and 102 are already synchronized with each other, and already know which frequency band the terminal 101 uses and at which timing the terminal 101 transmits a signal. These negotiations may be done using another dedicated frequency band, or using a wideband, such as UWB, so as not to interfere with other systems.

The terminal 101 selects a certain one of the frequency bands in which the own system is permitted to execute communication, and transmits a signal. Specifically, before transmitting a signal, the terminal 101 performs interference detection (carrier sense [CS]) in a frequency band including a frequency band for transmitting a signal (301). The interference detection is performed by the RSSI measuring unit 204 and interference detection unit 205. When it is determined in the interference detection process that no interference signal exists, the signal transmission processing unit 211, DAC 212 and RF unit 213 perform signal transmission (302). To continue signal transmission, another interference detection (303) is performed in the same manner as the above, and then another signal transmission (304) is performed. Thus, interference detection is performed before signal transmission.

Figure 4:
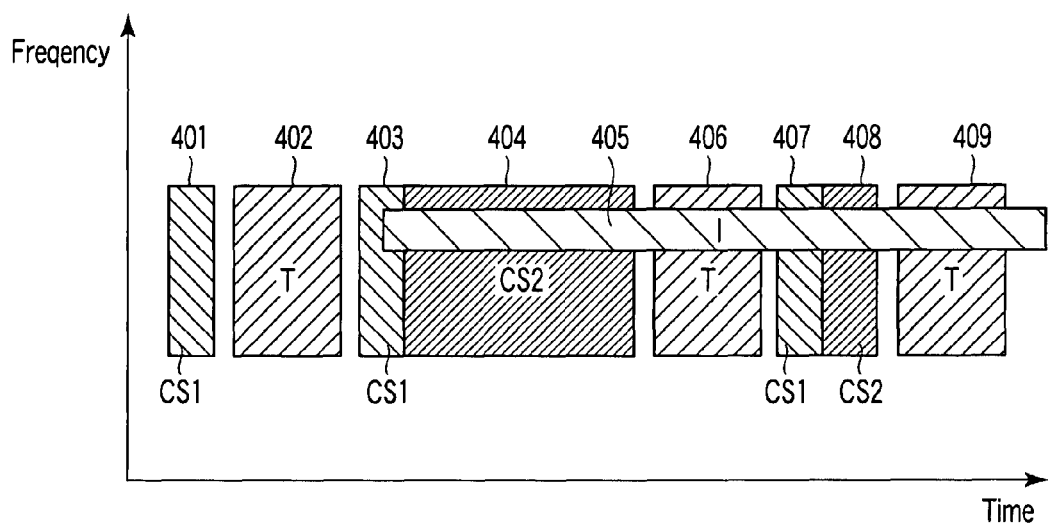
FIG. 4 is a view illustrating examples of interference detection processing, interference analysis processing and signal transmission processing performed by the communication apparatus of FIG. 2.

Referring then to FIG. 4, examples will be given of interference detection, interference analysis and signal transmission performed by the terminal 101 in the first embodiment.

As in the case of FIG. 3, the terminal 101 executes interference detection (401), and executes signal transmission (402) after confirming that the frequency band for transmitting a signal contains no interference signal. Assume here that when another interference detection (403) is executed to continue signal transmission, an interference signal (405) occurs in the frequency band for transmitting a signal. At this time, since in the interference detection process (403), the interference signal is detected based only on whether power exists, it cannot be determined in which frequency band and what type of signal exists as an interference signal.

Upon detection of the interference signal (405) by the interference detection unit 205, the terminal 101 interrupts the signal transmission process, and executes interference analysis (404) using the interference analysis unit 209. In the interference analysis process (404), the interference analysis unit 209 analyzes what feature the interference signal (405) has. The interference analysis unit 209 confirms the frequency band that contains the interference signal (405), based on the frequency characteristic of the interference signal acquired by discrete Fourier transform of the DFT 206.

The interference analysis unit 209 estimates the system of the interference signal (405). If the estimated system has a higher priority than the own system, the terminal 101 does not resume signal transmission processing, thereby interrupting the communication or supplying the controller 210 with an instruction to continue the current communication using another frequency band. For instance, if the system of the apparatus that is transmitting the interference signal (405) is a cellular system licensed in the frequency band, like the terminal 103 and base station 104 in FIG. 1, the terminal does not resume signal transmission processing. Further, if the estimated system has a lower priority than the own system, and if the interference power of the former is low and hence the influence of the former upon the latter is determined to be small, the terminal 101 resumes signal transmission processing (406). For instance, if the system of the apparatus that is transmitting the interference signal (405) is a system that is not licensed in the frequency band, like the terminals 105 and 106 in FIG. 1, the terminal 101 resumes signal transmission processing. In this case, the signals output from them at the same time in the same frequency interfere with each other. However, if the power levels of the interference signals of the apparatuses are sufficiently low with respect to the modulation schemes of the apparatuses, their communications are possible. Also in this case, to enhance the quality of communication, the power of interference may be reduced using transmission power control, beam forming, etc.

When a request to continue signal transmission is issued, another interference detection (407) is executed. At this time, assume that the same interference signal (405) as that analyzed in the preceding interference analysis (404) has occurred. Since interference has been found in this interference detection (407), another interference analysis (408) is executed. At this time, however, the result of analysis acquired by the preceding interference analysis (404) is used to thereby reduce the feature quantity and time required for interference analysis. For instance, the number of sampling points for discrete Fourier transform in the frequency band of the interference signal, which is acquired by the preceding analysis, is reduced in the present interference analysis (i.e., the accuracy of analysis is made rougher than that in the preceding interference analysis (404)). As a result, the time required for the interference analysis (408) is reduced. This process utilizes the fact that it is strongly probable that the interference signal (405) will exist in the same frequency band as in the preceding interference analysis (404). However, if no interference signal is detected in an interference-signal-power measurement in the frequency band with the accuracy reduced, it is necessary to execute the same interference analysis as the preceding interference analysis (404).

It is a matter of course that the data amount of the feature quantities can be reduced by, for example, reducing the types of feature quantities, or reducing the digit of the values used for the interference analysis, compared to the preceding analysis, as well as by reducing the number of sampling points.

To select one modulation scheme as an estimation result from a large number of modulation scheme candidates, a large number of feature quantities are needed as described above. However, it is not necessary to use all feature quantities to determine whether the same modulation scheme is detected in the present interference analysis as in the preceding interference analysis (404). For instance, to select one modulation scheme as an estimation result from a variety of candidates, such as amplitude modulation (AM), M-ary amplitude shift keying (MASK), vestigial sideband (VSB), frequency modulation (FM), M-ary frequency shift keying (MFSK), double sideband suppressed carrier (DSB-SC), single sideband suppressed carrier (SSB-SC), binary phase shift keying (BPSK), quadrature phase shift keying (QPSK), estimation is executed using the standard variation of the amplitudes of the interference signal, the standard variation of the absolute values of the amplitudes, the peak property of the amplitudes, the standard deviation of the absolute values of the frequency components of the interference signal, the peak property of the frequency components, the standard deviation of the phases of the interference signal, the standard deviation of the absolute values of the phases, the frequency components of normalized absolute amplitudes, the existence/non-existence of right and left frequency components, the asymmetry of the frequency components, mid-frequency power, the maximum power of the frequency components, etc. However, to confirm in the interference analysis (408) whether the same modulation scheme as QPSK detected in the preceding interference analysis is used, it is sufficient if only the standard deviation of the phases of the interference signal, the standard deviation of the absolute values of the phases, the existence/non-existence of right and left frequency components, and the maximum power of the frequency components are used.

If it is determined in the present interference analysis (408) that the same interference signal as the interference signal (405) detected in the preceding interference analysis (404) exists, the signal transmission processing unit 211 of the terminal 101 perform signal transmission (409). In contrast, if it is determined in the present interference analysis (408) that the interference signal is not the same as the interference signal (405) detected in the preceding interference analysis (404), detailed interference signal analysis is executed again.

Figure 5:
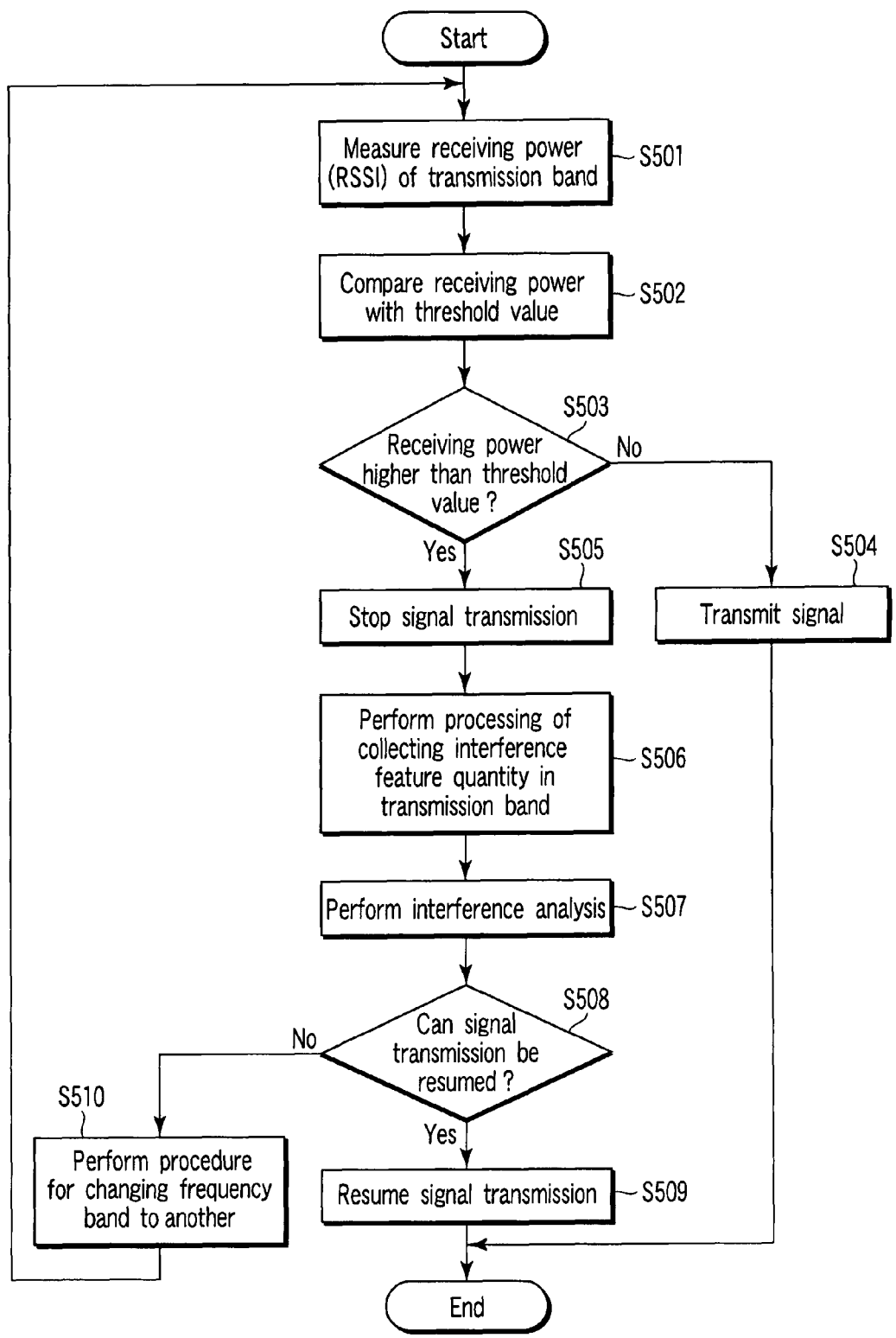
FIG. 5 is a flowchart illustrating an operation example of the communication apparatus of FIG. 2.

Referring then to FIG. 5, a description will be given of interference detection, interference analysis and signal transmission procedures employed in the terminal 101 in the first embodiment.

Firstly, the RSSI measuring unit 204 measures the RSSI as a feature quantity in a frequency band for transmitting a signal (step S501). Subsequently, the interference detector 205 compares the measured receiving power with a preset threshold value (step S502). At this time, the threshold value is set to, for example, a power level substantially equal to the thermal noise power. If the receiving power is lower than the threshold value (No at step S503), the terminal 101 transmits a signal as a normal operation, using the signal transmission processing unit 211, DAC 212 and RF unit 213 (step S504).

If the receiving power is not less than the threshold value (Yes at step S503), the interference detector 205 determines that an interference signal exists in the frequency band for transmitting a signal, and requests the signal transmission processing unit 211 to interrupt signal transmission, whereby the signal transmission processing unit 211 interrupts signal transmission (step S505). The DFT 206 and modulation-scheme estimation unit 207 collect the feature quantities of the interference signal used for interference signal analysis (step S506). The interference analysis unit 209 analyzes the interference signal using the collected feature quantities, thereby estimating the system of the apparatus that is transmitting the interference signal (step S507). After that, the interference analysis unit 209 determines from the interference analysis result whether signal transmission can be resumed (step S508). If it is determined that signal transmission can be resumed, the interference analysis unit 209 causes the controller 210 to supply the signal transmission processing unit 211 with an instruction to resume signal transmission processing, whereby the signal transmission processing unit 211 resumes signal transmission processing (step S509). If it is determined that signal transmission processing cannot be resumed, the interference analysis unit 209 abandons communication in the frequency band, and starts to execute a procedure of changing the transmission frequency band to another one (step S510). The negotiations for changing the frequency band may be done using another dedicated frequency band, or using a wideband, such as UWB, so as not to interfere with other systems.

Figure 6:
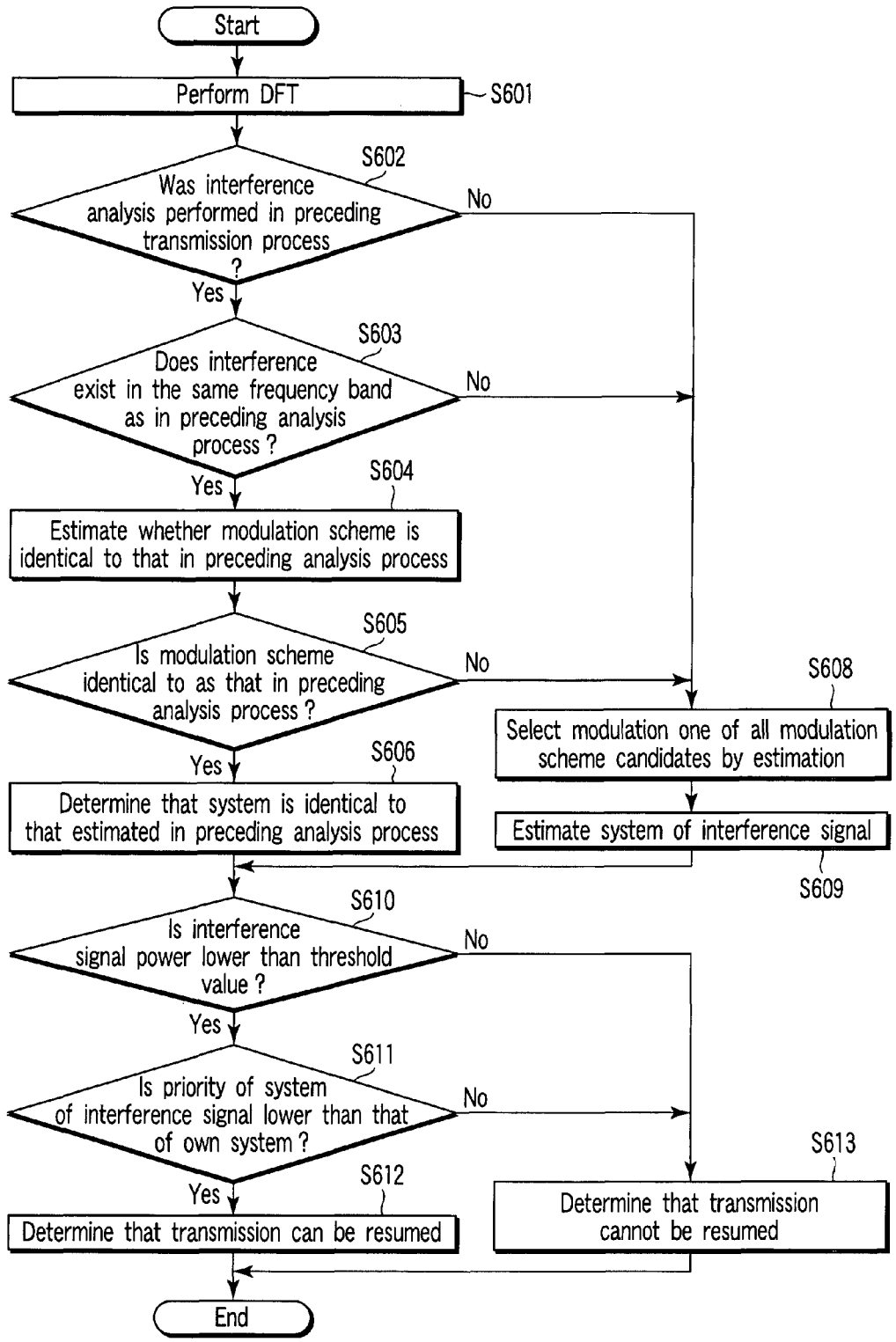
FIG. 6 is a flowchart illustrating specific processing examples performed at steps S507 and S508 in FIG. 5.

Referring to FIG. 6, a detailed description will be given of the interference signal analysis (step S507) and the signal-transmission resumption determination (step S508) performed in the first embodiment. FIG. 6 is a flowchart useful in explaining the operations performed after it is determined in the interference signal detection process that interference exists, and signal transmission is interrupted.

Firstly, the DFT 206 performs discrete Fourier transform on sampled, received signal components (step S601). With this process, the interference analysis unit 209 confirms the frequency band that contains an interference signal. Subsequently, the interference analysis unit 209 determines, referring to the memory in the controller 210, whether a reference signal was detected in the interference-signal detection process for the preceding signal transmission, and the interference analysis 404 was performed before the preceding signal transmission (step S602). For instance, in FIG. 4, when the present interference analysis process is a process 404, no interference was detected in the preceding interference detection process 401, and therefore no interference analysis is executed before the preceding signal transmission process 402. Further, when the present interference analysis process is a process 408, interference was detected during the preceding interference detection process 403, and hence the interference analysis 404 is performed before the preceding signal transmission process 406. If interference analysis was performed before the preceding signal transmission process, the interference analysis unit 209 refers to the memory of the controller 210 to determine whether the same interference signal exists in the same frequency band as that in the preceding modulation analysis (step S603). If it is determined that the interference signal exists in the same frequency band, the interference analysis unit 209 refers to the memory of the controller 210 to determine whether the interference signal is of the same modulation scheme as the interference signal analyzed in the preceding analysis process (step S604). In this process, although it is determined whether the modulation scheme is the same as the preceding, it may be determined whether another feature quantity is the same as the preceding. If the interference analysis unit 209 determines that the modulation scheme of the interference signal estimated by the modulation-scheme estimation unit 207 is the same as that of the previously analyzed interference signal, it determines that the system of the interference signal is identical to that of the previously analyzed interference signal (step S606). In contrast, if no interference signal analysis was executed in the preceding signal transmission process (No at step S602), or if the results of the present interference analysis differ from those of the preceding interference analysis (No at step S603 and No at step S605), the modulation-scheme estimation unit 207 selects one of all modulation scheme candidates by estimation (step S608), and the interference analysis unit 209 estimates the system of the interference signal based on the frequency band of the interference signal and the estimated modulation scheme (step S609).

In the first embodiment, when an interference signal exists in the same frequency band as that of a previously detected interference signal (Yes at step S603), the modulation scheme of the former signal is compared with that of the latter signal (step S605). However, this process may be modified such that a history of several past interference analysis results is stored, and when an interference signal is detected in the same frequency band as that of an interference signal stored in the history, the modulation scheme of the former signal is compared with that of the latter signal (step S605). Yet alternatively, the process may be modified such that the time when the preceding interference analysis was executed is stored as a history, and even when an interference signal is detected in the same frequency band as that of the preceding interference signal, the above-mentioned modulation-scheme estimation based on candidates may be executed (step S608) if the period elapsing from the time of the preceding interference signal analysis process to the time of the present one is greater than a threshold value. It is necessary to set the threshold value in accordance with the transmission cycle of each system having a priority in a target frequency band, or that of the system of an interference signal. In the case of, for instance, TV broadcasting, assuming that broadcasting breaks off late at night, the transmission cycle is considered to be several hours, therefore the threshold value may be several minutes-several hours. In the case of radars, the transmission cycle is considered to be of the order of second. Further, in the case of wireless LANs or cellular phones, the transmission cycle is considered to be of the order of millisecond. Therefore, the threshold value may be several microseconds to several milliseconds.

After the estimation of the interference signal system, the interference detector 205 compares, with a threshold value, the interference signal power detected in the transmission frequency band (step S610). This threshold value differs from that computed from thermal noise used in the interference detection (403), and is a variable value depending on the quality of service (QoS) of data being transmitted. For instance, if the modulation scheme of a transmission signal is a scheme (such as BPSK) showing a high resistance against interference, a high threshold value is set. In contrast, if the modulation scheme of a transmission signal is a scheme (such as 64 QAM) showing a low resistance against interference, a low threshold value is set. Further, if the coding rate of an error correction code is high, many errors can be corrected, and hence a high threshold value can be set. For a signal, such as a control signal, which requires real-time properties and cannot allow a large number of errors, a low threshold value must be set. In contrast, for data that can be downloaded, i.e., can be retransmitted, a high threshold value can be set.

If the interference signal power is determined to be lower than the threshold value (Yes at step S610), the interference analysis unit 209 compares the priority of the system of the interference signal estimated at steps S606 and S609 with that of the own system. If it is determined that the priority of the estimated system of the interference signal is lower than that of the own system (Yes at step S611), the interference analysis unit 209 determines that signal transmission processing can be resumed (step S612). If the priority of the former is determined to be higher than that of the latter (No at step S611), the interference analysis unit 209 determines that signal transmission processing cannot be resumed (step S613).

Since, in the first embodiment, signal transmission is temporarily stopped upon detection of interference, the probability of interference with other systems can be suppressed. Further, since signal transmission can be resumed in accordance with the result of interference analysis, the throughput of the own system can be enhanced.

Furthermore, since a plurality of systems are stored in relation to data indicating whether their priority levels are higher or lower than that of the own system, a decrease in the throughput of the own system can be prevented when communication is performed where unlicensed systems or other cognitive wireless machines exist.

Yet further, when apparatuses included in a licensed system are accessing each other, interference of the own system with the licensed-system apparatuses can be suppressed with the throughput of the own system enhanced, by the own system performing communication so as to avoid communication between the licensed-system apparatuses.

In addition, when interference signals are successively detected by the interference detector, the operation of the interference analysis unit can be completed in a short time in the second or later interference analysis process, if the number of feature quantities used for interference analysis is reduced based on the fact that the interference signals may well be of the same system or have similar characteristics. As a result, the throughput of the own system can be enhanced.

Second Embodiment

A communication apparatus according to a second embodiment differs from that of the first embodiment in interference analysis processing. Unlike the first embodiment, the communication apparatus of the second embodiment does not include the modulation-scheme estimation unit 207 or priority level database 208. Further, an interference analysis unit and controller incorporated in the second embodiment differ in operation from the interference analysis unit 209 and controller 210. In the following description, elements similar to those of the first embodiment are denoted by corresponding reference numbers, and their descriptions are omitted.

Figure 7:
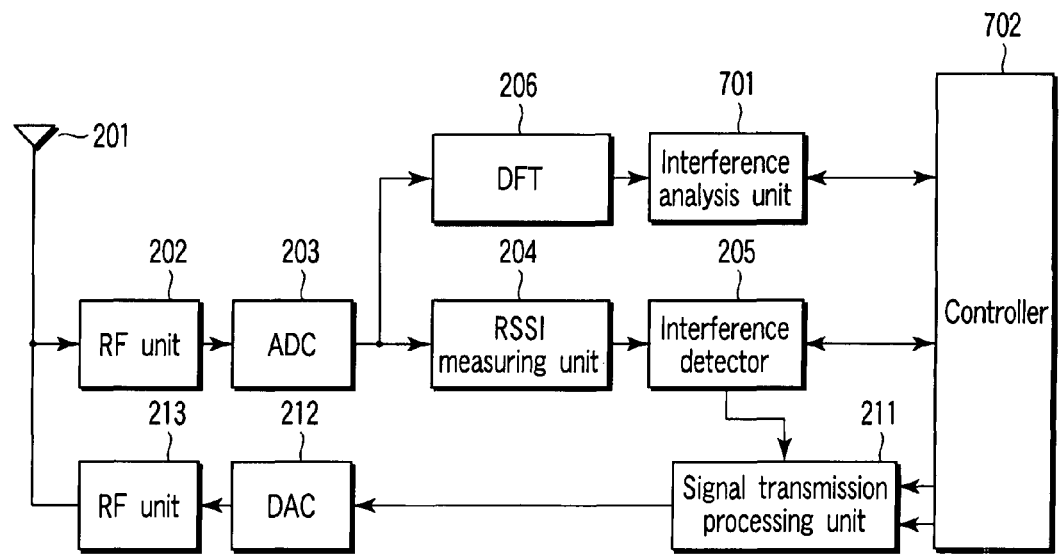
FIG. 7 is a block diagram illustrating a communication apparatus according to a second embodiment.

Referring to FIG. 7, the communication apparatus of the second embodiment will be described.

An interference analysis unit 701 acquires, from the DFT 206 that performs discrete Fourier transform, the power of each frequency component of an interference signal as a feature quantity, and determines whether communication can be resumed using an unoccupied frequency band included in the frequency bands assigned. The operation of the interference analysis unit 701 will be described later in detail with reference to FIG. 9.

A controller 702 receives the result of interference analysis from the interference analysis unit 701, and starts to execute a procedure of performing communication using another frequency band. The controller 702 controls signal transmission to avoid an interference signal in a frequency domain. Specifically, it controls the terminal 101 to transmit a signal in a frequency band that does not contain an interference signal, even when the interference signal occupies the same time-domain as the transmission signal. Further, when the interference analysis unit 701 determines from the result of the interference analysis that signal transmission can be resumed, the controller 702 receives, from the analysis unit, notification that signal transmission can be resumed, and sends it to the signal transmission processing unit 211, like the controller 210 of the first embodiment. Similarly, when the interference analysis unit 701 determines that signal transmission cannot be resumed, the controller 702 receives notification that signal transmission cannot be resumed, and sends it to the signal transmission processing unit 211.

Figure 8:
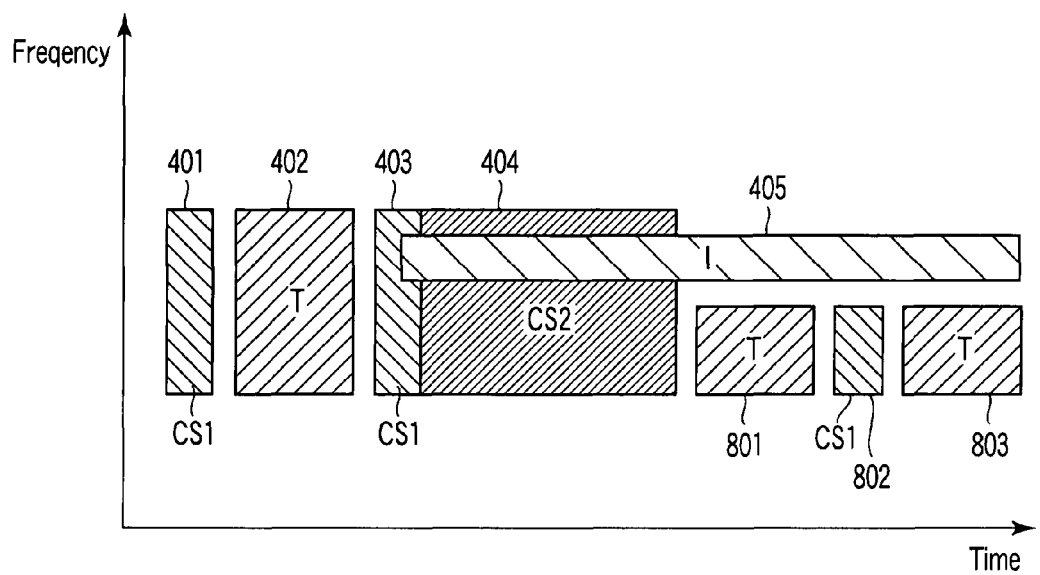
FIG. 8 is a view illustrating examples of interference detection processing, interference analysis processing and signal transmission processing performed by the communication apparatus of FIG. 7.

Referring then to FIG. 8, examples will be given of the interference detection, interference analysis and signal transmission performed by the terminal 101 in the second embodiment.

Assume here that the terminals 101 and 102 are already synchronized with each other, and already know which frequency band the terminal 101 uses and at which timing the terminal 101 transmits a signal. These negotiations may be done using another dedicated frequency band, or using a wideband, such as UWB, so as not to interfere with other systems.

The process, performed until the interference analysis unit 209 of the terminal 101 confirms the frequency band that contains an interference signal (405), from the frequency characteristic of the interference signal acquired by the DFT 206 performing discrete Fourier transform, is similar to that in the first embodiment shown in FIG. 4.

After confirming the mean frequency and frequency bandwidth of the interference signal (405) from the result of interference analysis, the interference analysis unit 701 supplies the controller 210 with an instruction to resume signal transmission processing using a low-interference frequency band in which the interference signal and a transmission signal least interfere with each other and hence respective communications do not influence each other, and the controller 210, in turn, controls the signal transmission processing unit 211 to do so (801). The low-interference frequency band differs from the frequency band of the interference signal. It is a matter of course that a more preferable effect can be acquired if a frequency band orthogonal to the interference signal is used as the low-interference frequency band. To successively transmit signals, the RSSI measuring unit 204 and interference detector 205 perform interference detection (802) in the low-interference frequency band in which signal transmission is to be resumed. After it is confirmed that no interference exists in this frequency band, the signal transmission processing unit 211 performs signal transmission (803).

In the second embodiment, interference analysis is performed using the frequency component of an interference signal as a feature quantity. However, if the coming direction of an interference signal is used as a feature quantity, and signal transmission is resumed with the null point of an adaptive array antenna oriented to the coming direction of the interference signal, spatial orthogonality can be utilized. Further, if the burst length, burst cycle and duty ratio of an interference signal are used as feature quantities, and signal transmission is resumed using temporal gaps, temporal orthogonality can be utilized. Yet further, if the interference signal is of DS-CDMA, and the spreading code of the signal is used as a feature quantity to resume signal transmission using a spreading code orthogonal to the interference signal, spreading code type orthogonality can be utilized. If the interference signal is made using frequency or temporal hopping, and signal transmission is resumed using a hopping pattern orthogonal to the interference signal, hopping pattern type orthogonality can be utilized. These frequency, spatial and temporal feature quantities and signal patterns, etc., will hereinafter be referred to as "orthogonal channels".

Figure 9:
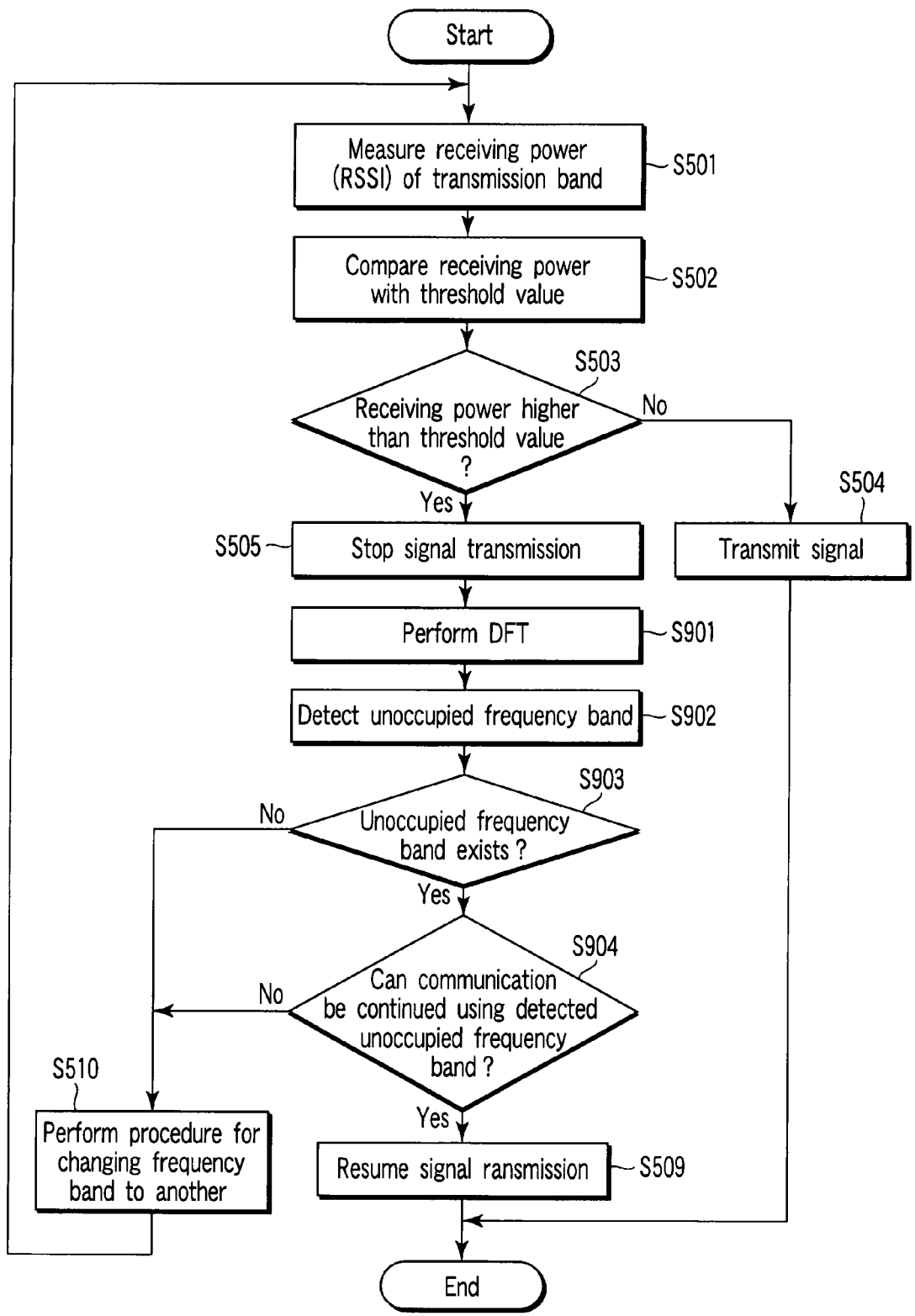
FIG. 9 is a flowchart illustrating an operation example of the communication apparatus of FIG. 7.

Referring to FIG. 9, other examples will be given of the interference detection, interference analysis and signal transmission performed by the terminal 101 in the second embodiment. In the following description, elements similar to those of the first embodiment are denoted by corresponding reference numbers, and their descriptions are omitted.

If the RSSI value measured by the RSSI measuring unit 204 exceeds a threshold value (Yes at step S503), it is determined that the frequency band for transmitting a signal contains an interference signal, thereby interrupting signal transmission (step S505). After that, to analyze the interference signal in the frequency band, the DFT 206 performs discrete Fourier transform (step S901), and the interference analysis unit 701 confirms the mean frequency and frequency bandwidth of the interference signal. Based on this, the interference analysis unit 701 detects an unoccupied frequency band containing no interference signal (step S901). When, for example, the reception power in the frequency band is lower than a threshold value substantially equal to thermal noise power, the frequency band is determined to be an unoccupied frequency band. Thus, if it is determined that an unoccupied frequency band exists (Yes at step S903), and if communication can be continued in the unoccupied frequency band (Yes at step S904), the interference analysis unit 701 instructs the controller 702 to perform transmission resumption processing, and the controller 702, in turn, controls the signal transmission processing unit 211 to perform signal transmission (step S509). In contrast, if it is determined that signal transmission resumption is impossible, interference analysis unit 701 abandons communication in the frequency band, and starts to execute a procedure of changing the transmission frequency band to another one (step S510).

In the second embodiment, when signal transmission cannot be resumed, the transmission frequency band is changed, which prevents the throughput of the own system from being reduced.

Third Embodiment

A communication apparatus according to a third embodiment differs from the first embodiment in interference analysis processing. Unlike the first embodiment, the communication apparatus of the third embodiment does not incorporate the priority level database 208. Instead, it incorporates a burst-length/duty ratio/cycle estimation unit 1001. Further, the interference analysis unit and controller of the third embodiment differ in operation from the interference analysis unit 209 and controller 210 of the first embodiment.

Figure 10:
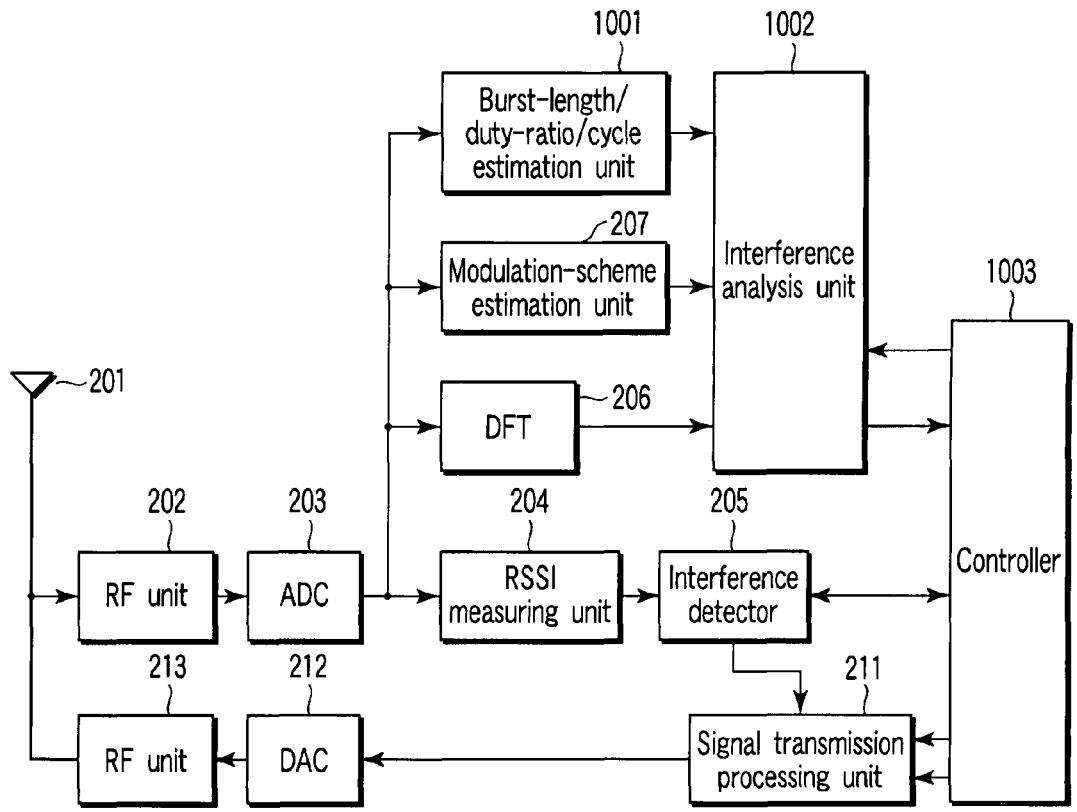
FIG. 10 is a block diagram illustrating a communication apparatus according to a third embodiment.

Referring to FIG. 10, the communication apparatus of the third embodiment will be described.

The burst-length/duty ratio/cycle estimation unit 1001 estimates the burst length, duty ratio and cycle of an interference signal based on a digital signal received from the ADC 203. The duty ratio of a certain signal means the ratio of the time during which the signal is occurring, to the time during which no signal is occurring.

An interference analysis unit 1002 determines whether signal transmission can be resumed, based on information from the modulation-scheme estimation unit 207 and DFT 206, and the result of the preceding interference analysis stored in a controller 1003. If determining that signal transmission cannot be resumed, the interference analysis unit 1002 informs the controller 1003 of this. The operation of the interference analysis unit 1002 will be described later in detail with reference to FIG. 12.

Upon receiving the result of the interference analysis, the controller 1003 starts to execute a procedure of performing communication using another frequency band. The controller 1003 controls transmission so as to temporally avoid the interference signal. Specifically, the controller 1003 controls the terminal 101 to execute signal transmission, using substantially the same frequency band, during the time when no interference signal is transmitted. Upon receiving an instruction from the interference analysis unit 1002, the controller 1003 controls the signal transmission processing unit 211 in accordance with the instruction.

Figure 11:
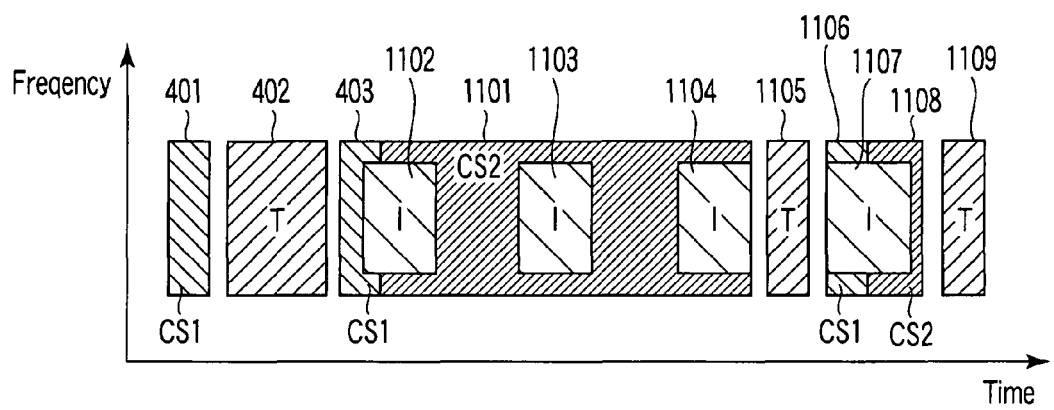
FIG. 11 is a view illustrating examples of interference detection processing, interference analysis processing and signal transmission processing performed by the communication apparatus of FIG. 10.

Referring to FIG. 11, examples will be given of the interference detection, interference analysis and signal transmission performed by the terminal 101 in the third embodiment.

In the same manner as in the case of FIG. 3, in the terminal 101, the interference detector 205 performs interference detection (401) to confirm that no interference signal exists in a frequency band in which signal transmission is performed. After that, the signal transmission processing unit 211 performs signal transmission processing (402). Assume here that when the interference detector 205 performs interference detection (403) to successively transmit signals, an interference signal (1102) exists in the frequency band. In the interference detection (403), since the existence of the interference signal is detected only based on whether power exists, it cannot be determined in which frequency band and what type of signal exists as an interference signal. After detection of the interference signal (1102), in the terminal 101, the signal transmission processing unit 211 interrupts signal transmission, and the interference analysis unit 1002 performs interference analysis (1101). In the interference analysis (1101), the interference analysis unit 1002 analyzes the characteristics of the interference signal (1102). Specifically, the DFT 206, modulation-scheme estimation unit 207 and burst-length/duty ratio/cycle estimation unit 1001 perform sampling of the interference signal (1102, 1103, 1104) and acquire the frequency characteristic, burst length, duty ratio and cycle of the interference signal. Based on the acquired data, the interference analysis unit 1002 estimates unoccupied frequency and time domains. Further, the interference analysis unit 1002 computes the standard variation of the amplitudes of the interference signal, the standard variation of the absolute values of the amplitudes, the peak property of the amplitudes, the standard deviation of the absolute values of the frequency components of the interference signal, the peak property of the frequency components, the standard deviation of the phases of the interference signal, the standard deviation of the absolute values of the phases, the frequency components of normalized absolute amplitudes, the existence/non-existence of right and left frequency components, the asymmetry of the frequency components, mid-frequency power, the maximum power of the frequency components, etc. From these feature quantities, the frequency band, modulation scheme and symbol rate of the interference signal (1102, 1103, 1104) can be estimated.

If the interference analysis unit 1002 estimates that the system of the interference signal (1102, 1103, 1104) is identical to the system of an apparatus that is transmitting a periodic burst signal, and that the terminal 101 can continue the current communication using an unoccupied time domain, the terminal 101 resumes signal transmission processing using an unoccupied time domain (1105). For instance, if the system of the interference signal (1102, 1103, 1104) is a communication system, such as the up-communication scheme of PHS, in which time-division multiplexing is performed, system estimation can be performed from the modulation scheme and pilot signal of the system, and an unoccupied time can be estimated from the burst length and cycle of the system. Accordingly, communication can be resumed using an orthogonal time. An orthogonal time means a time in which signals are temporally deviated from each other and do not influence each other.

When a request to continue the signal transmission occurs, the interference detector 205 performs interference detection (1106). Assume here that an interference signal (1107) of the same system as that of the interference signal analyzed in the preceding interference analysis process (1101) exists. In this case, since the existence of the interference signal (1107) is detected in the interference detection process (1106), another interference analysis (1108) is performed. At this time, however, the result of the preceding interference analysis (1101) is used to reduce the number of feature quantities and the time for the present interference analysis. Specifically, the modulation scheme of the interference signal is estimated, then the end of the transmission burst is detected, and signal transmission (1109) is performed. In this process, cycle estimation is omitted.

Figure 12:
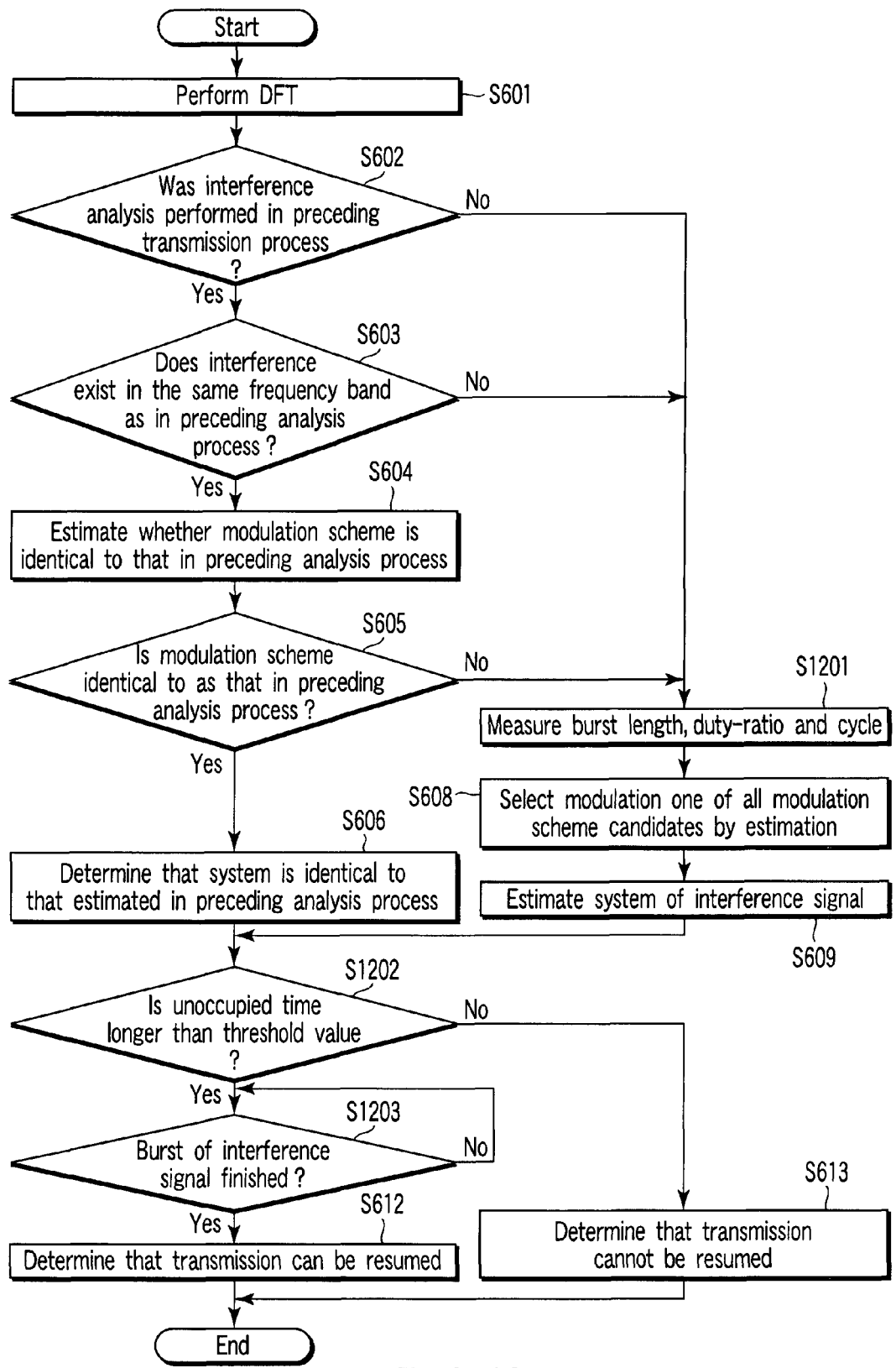
FIG. 12 is a flowchart illustrating operation examples of the communication apparatus of FIG. 10 performed during interfering signal analysis processing and signal-transmission-resumption determination processing.

The interference detection, interference analysis and signal transmission performed by the terminal 101 in the third embodiment are similar to those of the first embodiment shown in FIG. 5, except for detailed operations of steps S507 and S508 in FIG. 5. Referring now to FIG. 12, examples will be given of interference signal analysis (step S507) and signal-transmission-resumption determination (step S508) performed in the third embodiment.

If no interference signal analysis was executed in the preceding transmission process (No at step S602), or if the result of the present interference analysis differs from that of the preceding one (No at step S603 or S605), the burst-length/duty ratio/cycle estimation unit 1001 measures the burst length, duty ratio and cycle of the interference signal (step S1201). In this case, the system of the interference signal is estimated only using the estimated modulation scheme. However, system estimation may be performed using the measured signal power, signal frequency bandwidth, symbol rate, pilot pattern, burst length, duty ratio, etc. Further, the system may be noticed by broadcasting using, for example, a common indicator pattern or common protocol.

After the system estimation of the interference signal is completed, the interference analysis unit 1002 computes an unoccupied time usable for continuation of communication, based on the measured burst length, duty ratio and cycle, and compares it with a threshold value (step S1202). The threshold value is a variable that depends upon the QoS of the data that is being transmitted. For instance, the greater the amount of data required for communication, the higher the threshold value, and the smaller the former, the lower the latter. If it is determined that the unoccupied time is longer than the threshold value (Yes at step S1202), the interference detector 205 detects the end of the transmission burst of the interference signal (step S1203), and then determines that signal transmission can be resumed (step S612).

In the third embodiment, when signal transmission cannot be resumed because of the existence of an interference signal, it is performed during a time except for the time in which an interference signal occurs, thereby preventing the throughput of the own system from being reduced. Further, when the priority of the interference signal is higher than that of a transmission signal, the QoS may not be compensated for even if transmission of the signal is resumed using an orthogonal unoccupied time. In this case, if communication is performed using another frequency band, the QoS can be compensated for.

Fourth Embodiment

A communication apparatus according to a fourth embodiment differs from the second embodiment in interference detection and interference analysis processing. Unlike the second embodiment, the communication apparatus of the fourth embodiment additionally incorporates a signal reception processing unit. Further, the signal transmission processing unit, interference detector and controller differ in operation from those of the second embodiment.

Figure 13:
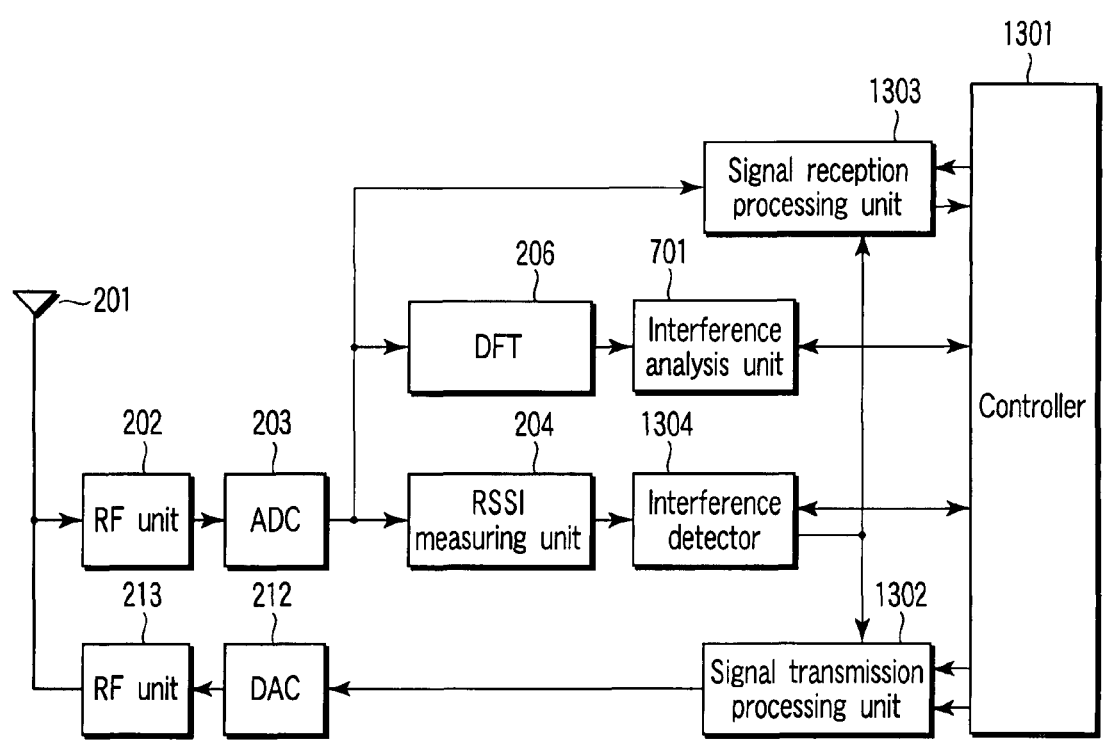
FIG. 13 is a block diagram illustrating a communication apparatus according to a fourth embodiment.

Referring to FIG. 13, the communication apparatus of the fourth embodiment will be described.

When the interference analysis unit 701 determines, as a result of interference analysis, that signal transmission can be resumed, it supplies information indicating an unoccupied frequency band to a controller 1301, and the controller 1301, in turn, instructs a signal transmission processing unit 1302 to perform transmission processing using the unoccupied frequency band.

When the interference analysis unit 701 determines that signal transmission cannot be resumed using a certain frequency band, it supplies the controller 1301 with information indicating that signal transmission cannot be resumed, and the controller 1301, in turn, starts to execute a procedure of performing communication using another frequency band, based on a result of interference analysis.

The controller 1301 also controls signal reception processing. Upon noticing the analysis result, the controller 1301 supplies the RF unit 202, ADC 203 and signal reception processing unit 1303 with an instruction to wait for a signal in a frequency band through which the signal may be transmitted. If the controller 1301 has received notification of detection of interference during signal reception processing, it supplies the signal transmission processing unit 1302 with an instruction to interrupt signal transmission processing. After that, the controller 1301 assumes a standby state for waiting for notification of an unoccupied frequency band. If the controller 1301 has not received notification of detection of interference, it controls an interference detector 1304 to compare the RSSI with a threshold value. If the received-signal power is lower than the threshold value, the controller 1301 receives notification of detection of no interference from the interference analysis unit 701, and controls the signal transmission processing unit 1302 to perform signal transmission processing as normal processing. In contrast, if the received-signal power is higher than the threshold value, the controller 1301 receives notification of detection of interference, and controls the signal transmission processing unit 1302 to interrupt signal transmission processing.

The signal transmission processing unit 1302 performs processing for transmitting notification of detection of interference and notification of an unoccupied frequency band.

The signal reception processing unit 1303 receives, from other communication apparatuses, notification of detection of interference and notification of an unoccupied frequency band.

The interference detector 1304 compares the received RSSI value with a threshold value. The threshold value is set substantially equal to thermal noise power. If the received signal power is lower than the threshold value, the interference detector 1304 informs the signal reception processing unit 1303 that no interference exists. If the received signal power is not lower than the threshold value, the interference detector 1304 instructs the signal transmission processing unit 1302 to transmit a signal indicating that interference has been detected, and informs the controller 1301 that interference has been detected.

Figure 14:
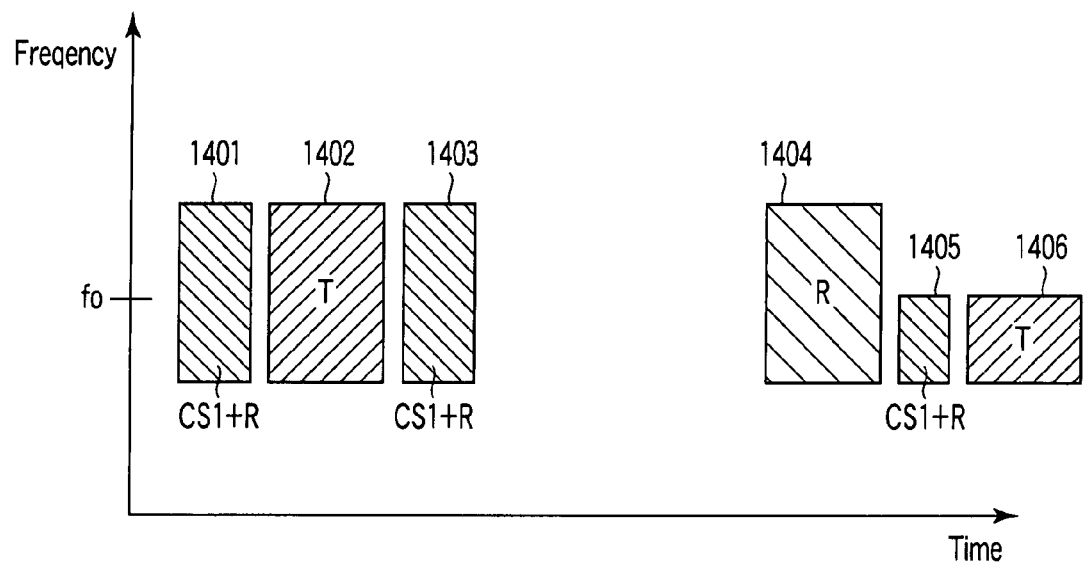
FIG. 14 is a view illustrating examples of signal transmission, interference detection and reception of an interference analysis result performed by the communication apparatus of FIG. 13 when it transmits a data signal.
Figure 15:
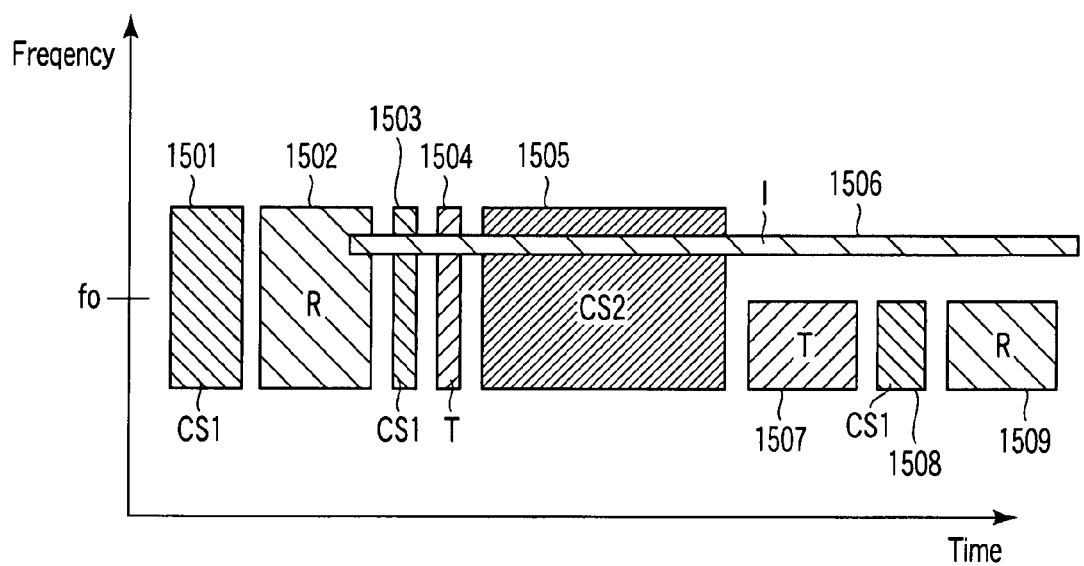
FIG. 15 is a view illustrating examples of signal transmission, interference detection and reception of an interference analysis result performed by the communication apparatus of FIG. 13 when it receives a data signal.

Referring to FIG. 14, examples will be given of signal transmission, interference detection and reception of an interference analysis result by the terminal 102 in the fourth embodiment. Further, referring to FIG. 15, examples will be given of interference detection, interference analysis and transmission of results of interference detection and analysis by the terminal 101 in the fourth embodiment.

Assume here that the terminals 101 and 102 are synchronized with each other, and already know through which frequency band and what timing the terminal 102 transmits a signal. These negotiations may be done using another dedicated frequency band, or using a wideband, such as UWB, so as not to interfere with other systems.

Before receiving a signal from the terminal 102, the terminal 101 confirms whether interference exists, i.e., the interference detector 1304 thereof performs interference detection (1501). On the other hand, the interference detector 1304 of the terminal 102 performs interference detection (1401) before transmitting a signal. The interference detection (1401) performed by the terminal 102 includes processing of receiving notification of detection of interference from the terminal 101, which will be described later. Assume here that none of the terminals 101 and 102 has detected interference, and the terminal 102 transmits a signal to the terminal 101 (1402, 1502).

When a subsequent request to transmit a signal from the terminal 102 to the terminal 101 has been issued, the terminals 101 and 102 again perform interference detection (1403, 1503). Assume here that a terminal 103 existing near the terminal 101 is transmitting an interference signal (1506), and that this interference signal can be detected by the terminal 101, but cannot be detected by the terminal 102 since the terminals 102 and 103 exist far away from each other. When the interference detector 1304 of the terminal 101 has detected the interference signal (1506) by the interference detection (1503), the signal transmission processing unit 1302 of the terminal 101 transmits, to the terminal 102, notification (1504) that interference has been detected. This notification (1504) is transmitted while the terminal 102 is performing interference detection and processing (1403) for receiving the notification, using the same frequency band as that of the interference detection and processing. Further, it is desirable that the interference detection notification (1504) be transmitted with power that does not adversely affect communication of the terminal 103 and base station 104. To this end, the signal for carrying the interference detection notification (1504) should be sufficiently spread, the transmission beam should be directed to the terminal 102, and/or the null point be directed to the terminal 103. Note that the interference detection notification (1504) only indicates that interference has been detected and instructs the terminal 102 to interrupt transmission.

In the terminal 102, the signal reception processing unit 1303 receives the interference detection notification (1504) during interference detection and processing (1403) for receiving the interference detection notification, and the signal transmission processing unit 1302 interrupts transmission of the next signal. In the terminal 101, after the signal transmission processing unit 1302 transmits the interference detection notification (1504), the interference analysis unit 701 performs interference analysis (1505). In the interference analysis (1505), the feature of the interference signal (1506) is analyzed. In this embodiment, the interference signal is subjected to sampling, and the DFT 206 performs discrete Fourier transform on the signal to obtain the frequency characteristic thereof as a feature quantity. From this feature quantity, the frequency band of the interference signal (1506) is confirmed. After the interference analysis unit 701 confirms, by the interference analysis, the mean frequency and frequency bandwidth of the interference signal (1506), the terminal 101 transmits an interference analysis result (1507) using a frequency band orthogonal to the interference signal. It is desirable that the interference analysis result (1507) be sent using a signal that has high redundancy and can be easily determined by blind estimation by the terminal 102, since the terminal 102 does not know through which frequency band the analysis result is transmitted. For instance, the interference analysis result (1507) may be sent using a frequency-divided multi-carrier signal with carriers carrying the same signal, and the terminal 102 may receive all carriers. The interference analysis result (1507) also includes information indicating an unoccupied frequency band used by the terminal 102 to resume transmission. Using the unoccupied frequency band, the terminal 101 performs interference detection (1508), and the terminal 102 performs interference detection and processing for receiving notification of interference detection (1405), and resumes signal transmission processing (1406, 1509).

Figure 16:
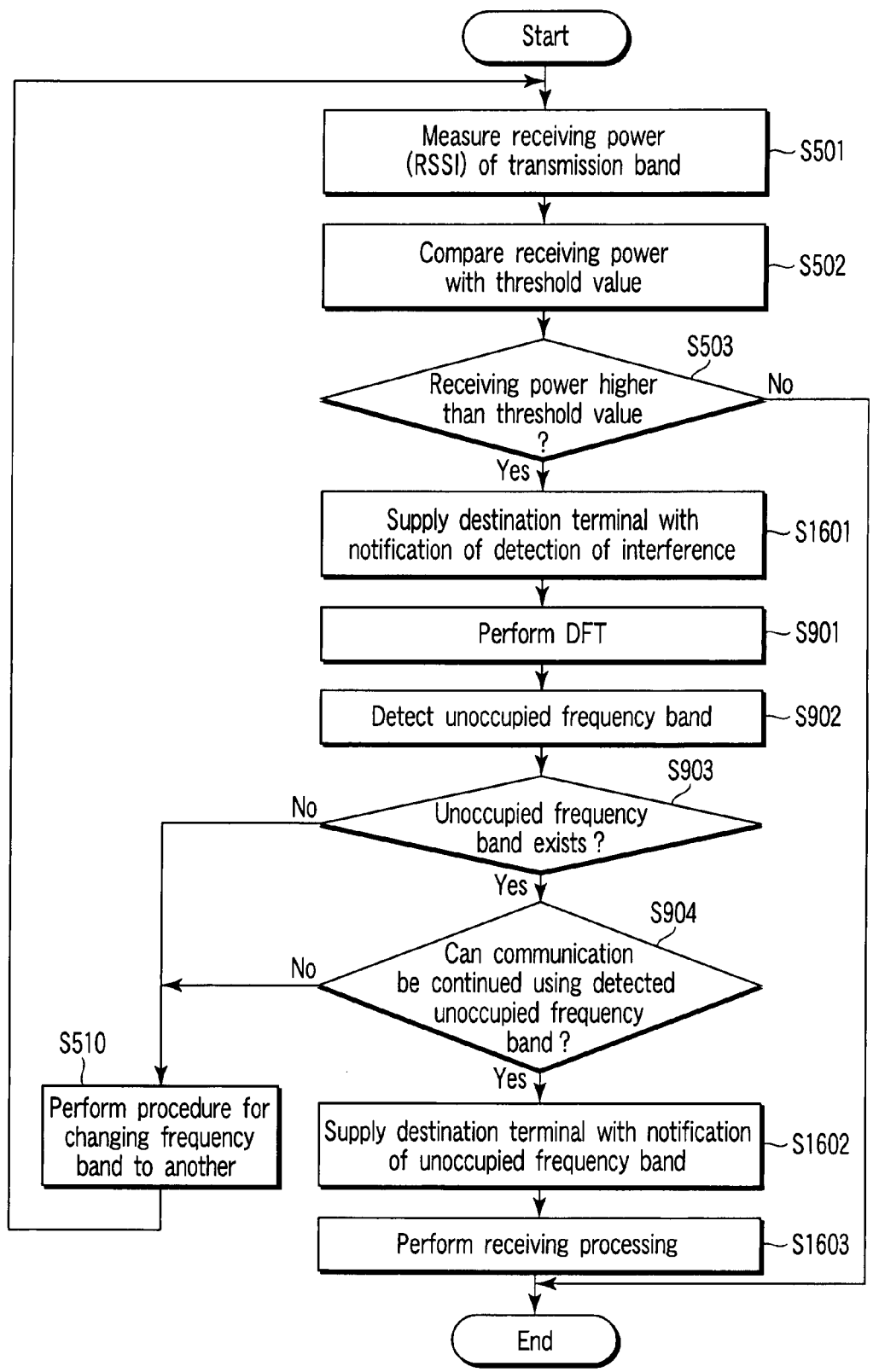
FIG. 16 is a flowchart illustrating an operation example of the communication apparatus of FIG. 13 performed when receiving a data signal.

Referring then to FIG. 16, a description will be given of interference detection, interference analysis, interference notification and signal receiving procedure executed by the terminal 101 in the fourth embodiment. The flowchart of FIG. 16 is similar to that of FIG. 9 except that the former additionally includes the process of informing a destination terminal of detection of interference, and the process of informing the destination terminal of an unoccupied frequency band.

Firstly, the RSSI measuring unit 204 of the terminal 101 measures the receiving power (RSSI) of a signal-receiving frequency band as a feature quantity (step S501). The interference detector 1304 compares the measured RSSI value with a threshold value. If the RSSI value is higher than the threshold value (Yes at step S503), the interference detector 1304 determines that the signal-receiving frequency band contains an interference signal, and instructs the signal transmission processing unit 1302 to send notification of the existence of the interference signal to the terminal 102. The signal transmission processing unit 1302, in turn, sends the notification to the terminal 102 (step S1601) (corresponding to 1504 in FIG. 15).

When the receiving power of a certain frequency band is lower than a threshold value corresponding to thermal noise power, the interference detector 1304 of the terminal 101 determines that this frequency band is not occupied. It is determined from this result that an unoccupied frequency band exists (Yes at step S903), and communication can be continued using the detected unoccupied frequency band (Yes at step S904), the signal transmission processing unit 1302 informs the terminal 101 of the unoccupied frequency band (step S1602) (corresponding to 1407 in FIG. 14). After that, the terminal 101 receives a signal transmitted (step S1603) (corresponding to 1509 in FIG. 15).

Figure 17:
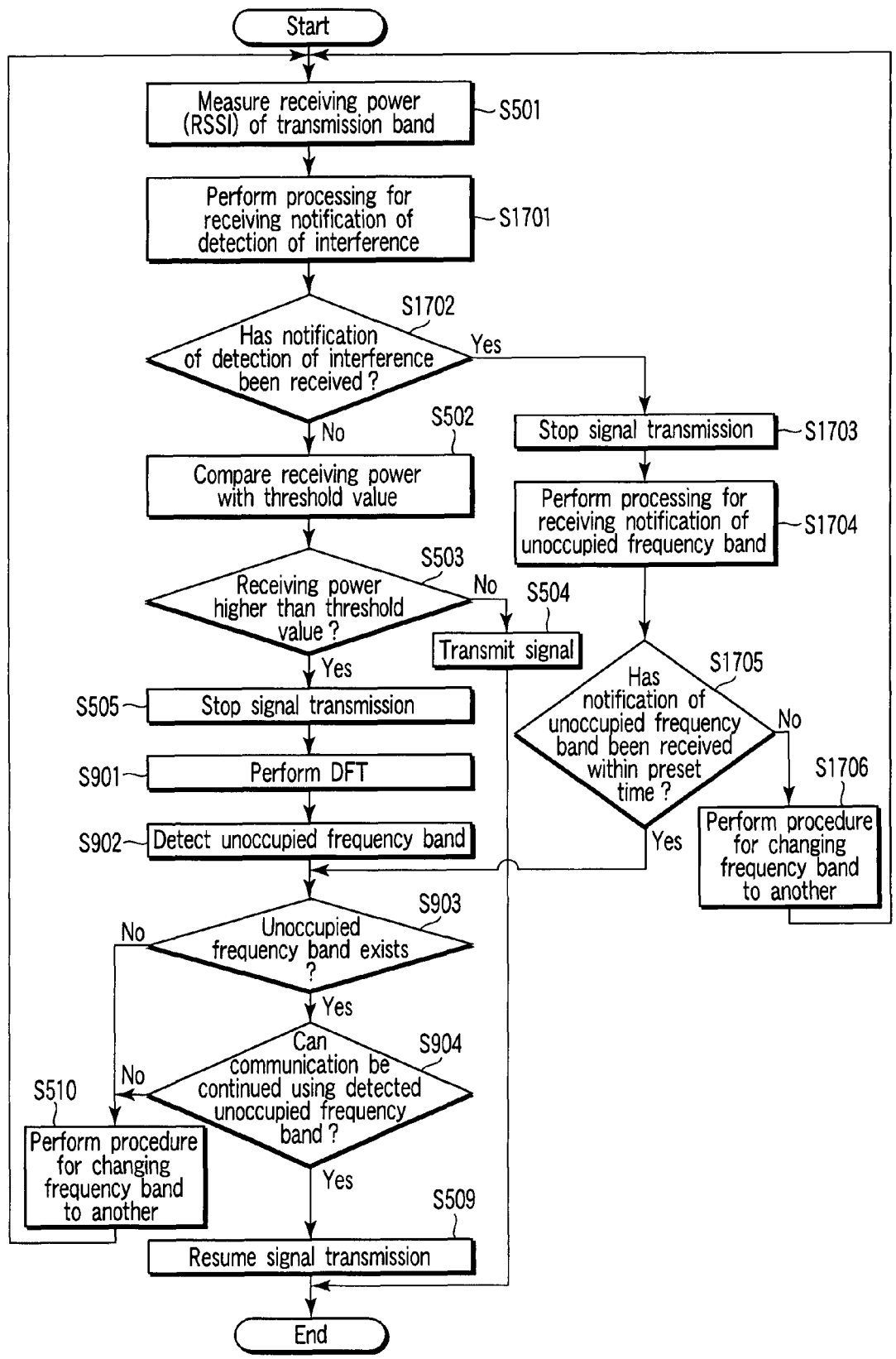
FIG. 17 is a flowchart illustrating an operation example of the communication apparatus of FIG. 13 performed when transmitting a data signal.

Referring then to FIG. 17, a description will be given of interference detection, interference analysis, interference notification reception and signal transmission procedure executed by the terminal 102 in the fourth embodiment. The flowchart of FIG. 17 is the same as FIG. 9 in the steps S1702 et seq. The former additionally includes a flow related to interference detection notification.

Firstly, the terminal 102 measures the receiving power (RSSI) of a signal-transmitting frequency band as a feature quantity (step S501). At the same time, the signal reception processing unit 1303 of the terminal 102 executes processing for receiving interference detection notification from the terminal 101 (step S1701). If the terminal 102 has received the interference detection notification from the terminal 101 (Yes at step S1702), it interrupts transmission of the next signal (step S1703). After that, the terminal 102 waits for notification of an interference analysis result (unoccupied frequency band) from the terminal 101 (step S1704). If the terminal 102 has not received the interference detection notification from the terminal 101 (No at step S1702), it starts a procedure of continuing the current communication using another frequency band (step S1706).

While executing interference detection processing, the communication apparatus of the fourth embodiment can receive, from another communication apparatus, notification of interference detection, notification of the interruption of transmission, notification of an interference analysis result, and notification of an unoccupied frequency band that can be used for resuming transmission. Accordingly, the throughput of the communication apparatus can be enhanced.

The programs according to the embodiments disclosed above are stored as non-transitory computer readable storage medium, which when executed result in the steps disclosed above.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A communication apparatus, comprising:
   an antenna configured to receive and transmit signals;
   a measuring unit configured to measure a first interference feature quantity indicating a first state of an interference signal in a transmission frequency band from the signals received by the antenna;
   a determination unit configured to determine from the first interference feature quantity whether the interference signal exists in the transmission frequency band;
   an acquisition unit configured to acquire, after measurement of the first interference feature quantity, a transmission channel from a second interference feature quantity measured by the measuring unit, the transmission channel corresponding to at least one of a frequency orthogonal to the interference signal, a time orthogonal to the interference signal, a space orthogonal to the interference signal, and a spreading code orthogonal to the interference signal; and
   a transmission unit configured to perform a first transmission via the antenna using the transmission frequency band when it is determined that no interference signal exists in the transmission frequency band, and to perform a second transmission via the antenna using the transmission channel when it is determined that the interference signal exists in the transmission frequency band, wherein:

the acquisition unit stores the transmission channel;

the measuring unit measures, after the second transmission, a third interference feature quantity indicating a second state of the interference signal in the transmission frequency band;

the determination unit determines from the third interference feature quantity whether the interference signal exists in the transmission frequency band; and the transmission unit performs a next transmission via the antenna when it is determined that the interference signal exists in the transmission frequency band, using a simplified-analysis transmission channel included in the transmission frequency band and acquired by the acquisition unit from a fourth interference feature quantity, the fourth interference feature quantity being acquired by the measuring unit after a determination of the determination unit, the fourth interference feature quantity containing a smaller number of types of data items than the second interference feature quantity.

2. A communication apparatus, comprising:

an antenna configured to receive and transmit signals;

a measuring unit configured to measure a first interference feature quantity indicating a state of an interference signal in a transmission frequency band from the signals received by the antenna;

a determination unit configured to determine from the first interference feature quantity whether the interference signal exists in the transmission frequency band;

an acquisition unit configured to acquire, after measurement of the first interference feature quantity, a transmission channel from a second interference feature quantity measured by the measuring unit, the transmission channel corresponding to at least one of a frequency orthogonal to the interference signal, a time orthogonal to the interference signal, a space orthogonal to the interference signal, and a spreading code orthogonal to the interference signal; and a transmission unit configured to perform a first transmission via the antenna using the transmission frequency band when it is determined that no interference signal exists in the transmission frequency band, and to perform a second transmission via the antenna using the transmission channel when it is determined that the interference signal exists in the transmission frequency band, wherein:

the transmission channel includes an orthogonal frequency band included in the transmission frequency band and orthogonal to the interference signal;

the acquisition unit stores the orthogonal frequency band;

the determination unit determines, after the second transmission, that the interference signal exists in the orthogonal frequency band; and the transmission unit performs a third transmission via the antenna using the orthogonal frequency band, regardless of the transmission channel acquired by the acquisition unit, when it is determined that no interference signal exists in the orthogonal frequency band.

3. A communication apparatus, comprising:

an antenna configured to receive and transmit signals;

a measuring unit configured to measure a first interference feature quantity indicating a state of an interference signal in a transmission frequency band from the signals received by the antenna;

a determination unit configured to determine from the first interference feature quantity whether the interference signal exists in the transmission frequency band;

an acquisition unit configured to acquire, after measurement of the first interference feature quantity, a transmission channel from a second interference feature quantity measured by the measuring unit, the transmission channel corresponding to at least one of a frequency orthogonal to the interference signal, a time orthogonal to the interference signal, a space orthogonal to the interference signal, and a spreading code orthogonal to the interference signal; and a transmission unit configured to perform a first transmission via the antenna using the transmission frequency band when it is determined that no interference signal exists in the transmission frequency band, and to perform a second transmission via the antenna using the transmission channel when it is determined that the interference signal exists in the transmission frequency band, wherein:

the interference signal is a periodic burst signal;

the transmission channel corresponds to a time orthogonal to the interference signal;

the acquisition unit acquires the orthogonal time from the second interference feature quantity; and the transmission performing unit performs a third transmission via the antenna during the orthogonal time after the second transmission before a determination of the determination unit.

4. A non-transitory computer readable storage medium storing instructions of a computer program which when executed by a computer results in performance of steps comprising:

measuring a first interference feature quantity indicating a first state of an interference signal in a transmission frequency band;

determining from the first interference feature quantity whether the interference signal exists in the transmission frequency band;

acquiring, after measurement of the first interference feature quantity, a transmission channel from a second interference feature quantity measured, the transmission channel corresponding to at least one of a frequency band orthogonal to the interference signal, a time orthogonal to the interference signal, a space orthogonal to the interference signal, and a spreading code orthogonal to the interference signal;

performing a first transmission using the transmission frequency band when it is determined that no interference signal exists in the transmission frequency band; and performing a second transmission using the transmission channel when it is determined that the interference signal exists in the transmission frequency band, wherein:

measuring the first interference feature quantity measures, after the second transmission, a third interference feature quantity indicating a second state of the interference signal in the transmission frequency band;

determining from the third interference feature quantity whether the interference signal exists in the transmission frequency band; and performing the second transmission performs a next transmission when it is determined that the interference signal exists in the transmission frequency band, using a simplified-analysis transmission channel included in the transmission frequency band and acquired from a fourth interference feature quantity the fourth interference feature quantity being acquired by measuring a third state of the interference signal in the transmission frequency band after the determining, the fourth interference feature quantity containing a smaller number of types of data items than the second interference feature quantity.

5. A communication method, comprising:

measuring a first interference feature quantity indicating a first state of an interference signal in a transmission frequency band;

determining from the first interference feature quantity whether the interference signal exists in the transmission frequency band;

acquiring, after measurement of the first interference feature quantity, a transmission channel from a second interference feature quantity measured, the transmission channel corresponding to at least one of a frequency band orthogonal to the interference signal, a time orthogonal to the interference signal, a space orthogonal to the interference signal, and a spreading code orthogonal to the interference signal;

performing a first transmission using the transmission frequency band when it is determined that no interference signal exists in the transmission frequency band; and performing a second transmission using the transmission channel when it is determined that the interference signal exists in the transmission frequency band, wherein:

measuring the first interference feature quantity measures, after the second transmission, a third interference feature quantity indicating a second state of the interference signal in the transmission frequency band;

determining from the third interference feature quantity whether the interference signal exists in the transmission frequency band; and performing the second transmission performs a next transmission when it is determined that the interference signal exists in the transmission frequency band, using a simplified-analysis transmission channel included in the transmission frequency band and acquired from a fourth interference feature quantity, the fourth interference feature quantity being acquired by measuring a third state of the interference signal in the transmission frequency band after the determining, the fourth interference feature quantity containing a smaller number of types of data items than the second interference feature quantity.

6. A communication method, comprising:

measuring a first interference feature quantity indicating a state of an interference signal in a transmission frequency band;

determining from the first interference feature quantity whether the interference signal exists in the transmission frequency band;

acquiring, after measurement of the first interference feature quantity, a transmission channel from a second interference feature quantity measured, the transmission channel corresponding to at least one of a frequency band orthogonal to the interference signal, a time orthogonal to the interference signal, a space orthogonal to the interference signal, and a spreading code orthogonal to the interference signal;

performing a first transmission using the transmission frequency band when it is determined that no interference signal exists in the transmission frequency band; and performing a second transmission using the transmission channel when it is determined that the interference signal exists in the transmission frequency band, wherein:

the transmission channel includes an orthogonal frequency band included in the transmission frequency band and orthogonal to the interference signal;

determining determines, after the second transmission, the interference signal exists in the orthogonal frequency band; and performing the second transmission performs a third transmission using the orthogonal frequency band, regardless of the transmission channel, when it is determined that no interference signal exists in the orthogonal frequency band.

7. A communication method, comprising:

measuring a first interference feature quantity indicating a state of an interference signal in a transmission frequency band;

determining from the first interference feature quantity whether the interference signal exists in the transmission frequency band;

acquiring, after measurement of the first interference feature quantity, a transmission channel from a second interference feature quantity measured, the transmission channel corresponding to at least one of a frequency band orthogonal to the interference signal, a time orthogonal to the interference signal, a space orthogonal to the interference signal, and a spreading code orthogonal to the interference signal;

performing a first transmission using the transmission frequency band when it is determined that no interference signal exists in the transmission frequency band; and performing a second transmission using the transmission channel when it is determined that the interference signal exists in the transmission frequency band, wherein:

the interference signal is a periodic burst signal;

the transmission channel corresponds to a time orthogonal to the interference signal;

acquiring the transmission channel acquires the orthogonal time from the second interference feature quantity; and performing the second transmission performs a third transmission during the orthogonal time after the second transmission before the determining.

\* \* \* \* \*